United States Patent
Kekre et al.

(10) Patent No.: US 7,739,677 B1
(45) Date of Patent: Jun. 15, 2010

(54) SYSTEM AND METHOD TO PREVENT DATA CORRUPTION DUE TO SPLIT BRAIN IN SHARED DATA CLUSTERS

(75) Inventors: Anand A. Kekre, Pune (IN); Oleg Kiselev, Palo Alto, CA (US); Robert Baird, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 966 days.

(21) Appl. No.: 11/139,100

(22) Filed: May 27, 2005

(51) Int. Cl.
*G06F 9/44* (2006.01)
*G06F 15/167* (2006.01)
*G06F 15/173* (2006.01)
*G06F 7/00* (2006.01)
*G06F 13/00* (2006.01)
*G06F 17/30* (2006.01)
*G06F 12/00* (2006.01)

(52) U.S. Cl. .................. 717/168; 717/121; 709/214; 709/217; 709/226; 707/8; 707/204; 711/113

(58) Field of Classification Search .............. 717/168, 717/121; 714/1–2, 20; 709/205, 213–217, 709/223–226, 244; 711/152, 113; 707/8, 707/204
See application file for complete search history.

(56) References Cited

U.S. PATENT DOCUMENTS

| 5,727,203 | A | * | 3/1998 | Hapner et al. ............ 707/103 R |
| 5,740,348 | A |   | 4/1998 | Cunliffe |
| 5,828,876 | A | * | 10/1998 | Fish et al. ....................... 707/1 |
| 5,940,827 | A | * | 8/1999 | Hapner et al. .................. 707/8 |
| 5,958,109 | A |   | 9/1999 | Fuderer |
| 5,963,973 | A | * | 10/1999 | Vanhove et al. ............. 711/130 |
| 5,966,706 | A | * | 10/1999 | Biliris et al. ................. 707/10 |
| 5,991,518 | A |   | 11/1999 | Jardine |
| 6,182,139 | B1 | * | 1/2001 | Brendel ....................... 709/226 |
| 6,279,032 | B1 | * | 8/2001 | Short et al. .................. 709/209 |
| 6,324,654 | B1 | * | 11/2001 | Wahl et al. ...................... 714/6 |
| 6,347,335 | B1 | * | 2/2002 | Shagam et al. .............. 709/223 |
| 6,477,624 | B1 | * | 11/2002 | Kedem et al. ................ 711/147 |
| 6,915,389 | B2 | * | 7/2005 | Fujimoto ..................... 711/148 |

(Continued)

OTHER PUBLICATIONS

Wilkins et al., "Disaster Tolerant Wolfpack Geo-Clusters", 2002, IEEE, 6 pgs.*

(Continued)

*Primary Examiner*—Wei Y Zhen
*Assistant Examiner*—Ryan D Coyer
(74) *Attorney, Agent, or Firm*—Meyertons, Hood, Kivlin, Kowert & Goetzel, P.C.

(57) ABSTRACT

A system and to prevent data corruption due to split brain in shared data clusters includes two or more nodes of a cluster, a shared storage device, and an update manager. The update manager may be configured to maintain a local persistent store corresponding to each node of the cluster. On receiving an update request directed to the shared storage device from a first node, the update manager may be configured to redirect the update to the local persistent store corresponding to the first node. The update manager may be further configured to verify a cluster membership status of the first node, and to transfer the contents of the update from the local persistent store to the shared storage device if the cluster membership verification succeeds.

27 Claims, 12 Drawing Sheets

U.S. PATENT DOCUMENTS

| | | | |
|---|---|---|---|
| 6,938,084 B2 * | 8/2005 | Gamache et al. | 709/226 |
| 7,039,694 B2 * | 5/2006 | Kampe et al. | 709/222 |
| 7,191,357 B2 * | 3/2007 | Holland et al. | 714/5 |
| 2002/0016827 A1 * | 2/2002 | McCabe et al. | 709/213 |
| 2003/0046286 A1 * | 3/2003 | Jacobs et al. | 707/8 |
| 2005/0283658 A1 * | 12/2005 | Clark et al. | 714/11 |

OTHER PUBLICATIONS

Ranade, "Chapter 10: Cluster Monitor", *Shared Data Clusters*, John Wiley & Sons, Inc., Indianapolis, IN, 2002, pp. 243-254.

\* cited by examiner

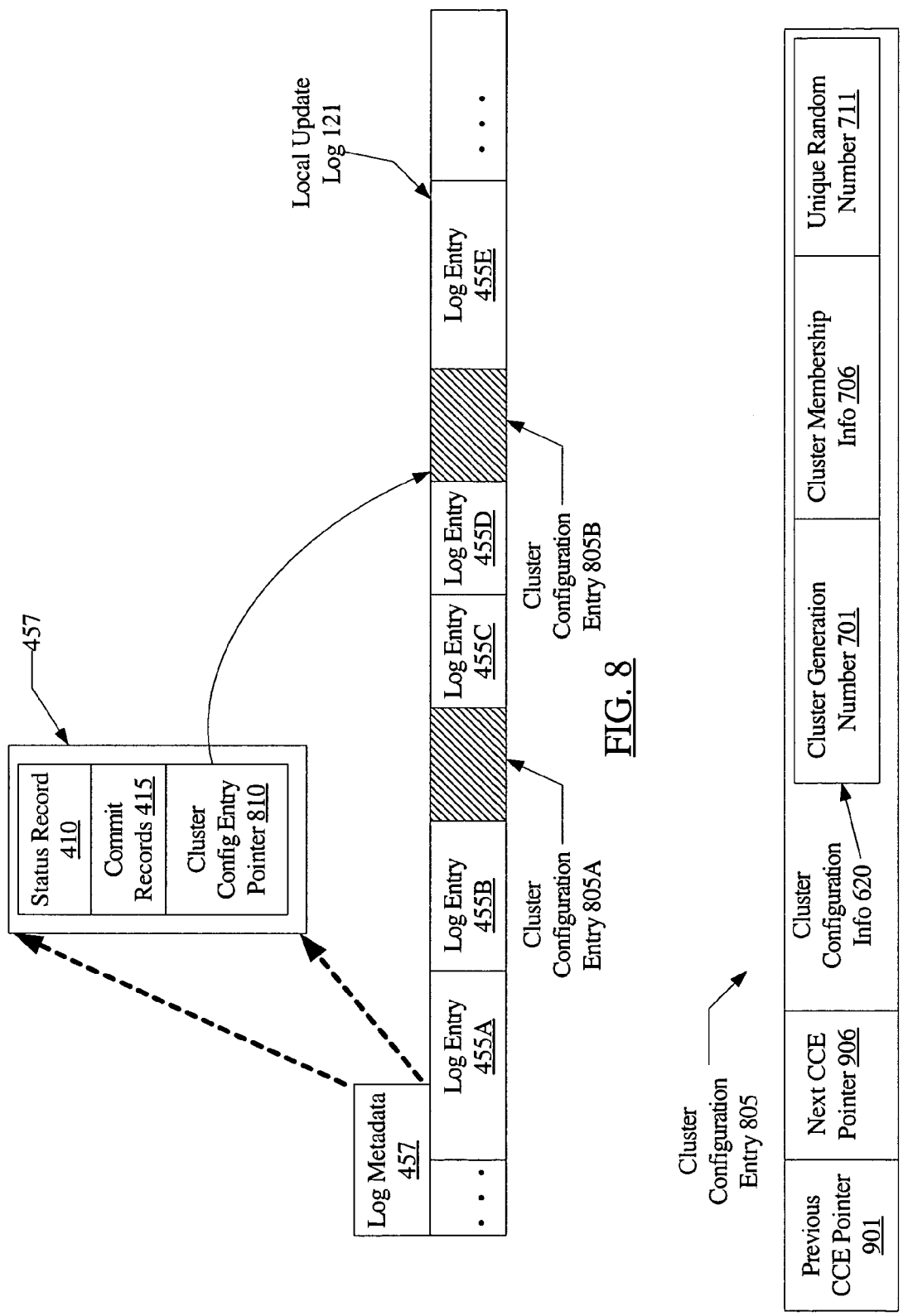

SYSTEM AND METHOD TO PREVENT DATA CORRUPTION DUE TO SPLIT BRAIN IN SHARED DATA CLUSTERS

BACKGROUND OF THE INVENTION

1. Field of the Invention

This invention relates to computer systems and, more particularly, to management and data integrity maintenance of clustered computer systems.

2. Description of the Related Art

Many business organizations and governmental entities rely upon complex mission-critical applications that require substantial computing power and also often access large amounts (e.g., terabytes or more) of data. The amount of computing power required may exceed the capacity of single computer servers, even in environments where multiprocessor servers are employed. Similarly, the amount of data being handled by the applications may exceed the limits of local storage capabilities of single computer servers. As a result, in many such environments, computer servers may be organized as one or more clusters of multiple cooperating nodes, where each node of a given cluster includes a computer server, and where the nodes of a cluster cooperate with each other to perform the data accesses and computations desired. In addition to providing aggregate increased computing and data processing power, clusters may also be configured to support other features desired in enterprise computing environments, such as increased application availability (e.g., using failover mechanisms) and centralized management.

A number of different types of cluster architectures may be implemented, based for example on application needs such as the expected type of computing and storage access patterns, the desired levels of availability, the nature of coupling (e.g., tight vs. loose coupling) or synchronization between different nodes, or on other factors. In general, components of clustering software are run on each node of a cluster to help coordinate the operations of the nodes and to manage cluster configuration. In one cluster organization, called "shared data clustering", the nodes of a cluster (each of which may correspond to a separate physical server and/or to an instance of a distributed or clustered application) share access to data storage devices, such as disk arrays or collections of independent disks. For example, the shared data storage devices may be accessible to each node of a cluster over a Storage Area Network (SAN) implemented using a combination of Fibre Channel and other storage interconnects such as various forms of SCSI. Shared data clustering may allow each node to access large amounts of data, and may allow data access and processing to continue in the event of one or more node failures—for example, surviving nodes may take up the functions originally performed by the failed nodes, and may access the data previously being accessed by the failed nodes. In general, the servers comprising a shared data cluster, as well as the collection of shared data storage devices, may be heterogeneous. For example, nodes may differ from one another in number of processors, processing power of each processor, processor architectures or vendors, operating systems, etc., and shared storage devices may differ from each other in storage capacity, vendor, protocols supported, reliability and performance levels, etc.

During normal operation, clustering software at a given node of a shared data cluster may be configured to communicate with clustering software at other nodes over a cluster interconnect. A component of the clustering software, which may be termed a cluster monitor in some environments, may be responsible for maintaining cluster membership information and propagating the information to each node, so that each node retains a consistent view of the set of nodes constituting the cluster. In the event of a failure of communication between the nodes of a cluster, for example due to a hardware failure in the interconnect and/or due to a software error, a cluster may become partitioned—that is, instead of all the nodes being able to communicate with each other, each node may only be able to communicate with a particular subset (or none) of the other nodes. Thus, nodes may form isolated pools, where a given node can communicate only with other nodes in its own pool, but not with a node in any other pool. Under some circumstances, more than one cluster partition or node may assume that it is the only surviving valid partition or node, and may attempt to access shared data as though no other node or partitions remained operational. Such a situation, in which multiple nodes or sets of nodes form independent clusters, may be termed a "split-brain" condition.

In a split-brain environment, more than one partition or node may attempt to access and update shared storage in an uncoordinated manner, thereby potentially causing data corruption. A number of solutions to avoiding data corruption as a result of split-brain have been attempted, such as quorum-disk based protocols and/or reservation-based protocols (e.g., using SCSI-3 persistent reservation mechanisms, based on a particular version of the Small Computer System Interface (SCSI) protocol). Reservation-based protocols may require each shared storage device to support an identical version of a storage protocol, which may not be a practical requirement in many heterogeneous storage environments. In quorum-disk protocols, a particular disk in the storage network may be designated as the quorum disk. Each node in the cluster may be given one vote in determining a quorum, while the quorum disk (or the node containing the quorum disk) may be given a higher number of votes (for example, as high as (N−1) votes if the cluster is expected to include a maximum of N nodes). The partition that has the maximum number of votes is considered to form a quorum and is allowed to continue to support the applications originally running on the cluster, while remaining partitions may be considered invalid (e.g., the nodes of the remaining partitions may be restarted in some cases). Quorum-disk based protocols may be too strict for small clusters, and are often prone to transient connectivity failures. It is possible for the storage devices to end up being partitioned between the pools as well. In cases of host-based mirroring and other data redundancy solutions, this can result in potential data corruption, for example if different mirrors of a mirrored data storage volume end up in different pools and their data are modified in mutually incompatible ways.

SUMMARY

Various embodiments of a system and method to prevent data corruption due to split brain in shared data clusters are disclosed. According to a first embodiment, the system includes two or more nodes of a cluster, a shared storage device, and an update manager. The update manager may comprise a plurality of components, some of which may be incorporated within one or more nodes of the cluster in some embodiments. The shared storage device may be accessible from each node of the cluster and from the update manager. The update manager may be configured to maintain a local persistent store corresponding to each node of the cluster. On receiving an update request directed to the shared storage device from a first node, a local component of the update manager running at the first node may be configured to redirect the update to the local persistent store corresponding to the first node. The update manager may also be configured to verify a cluster membership status of the first node, and to transfer the contents of the update from the local persistent store to the shared storage device if the cluster membership verification succeeds. In some embodiments, in verifying cluster membership status, the update manager may be configured to determine whether the first node belongs to a quorum, where the definition of the quorum may be configurable. If the cluster membership verification fails, the update manager may be configured not to transfer the update contents to the shared storage device. The update manager may thus ensure that only updates requested from a node that belongs to the quorum get reflected at shared storage. Update requests from nodes that do not belong to the quorum (e.g., from nodes of one or more invalid cluster partitions that may have been formed due to communication failures resulting in a split brain condition) may be prevented from corrupting shared data using such a technique.

In some embodiments, when the contents of the requested update (which may include a plurality of updated data blocks) have been written to the local persistent store, the local component of the update manager at the first node may be configured to return an update completion indication to the requester of the update (e.g., to an application instance). The verification of cluster membership status and the transfer of the update contents to shared storage may be asynchronous with respect to the sending of the update completion indication. That is, in such an embodiment, the response time for an update as seen by the requesting application may not include the time required to verify cluster membership status or to transfer the updated data to shared storage. In some embodiments, the operations of the update manager may be transparent to applications; e.g., during normal operation, applications running on the nodes of the cluster may be unaware of update redirection, cluster membership status verification, and/or asynchronous transfer of updated data to shared storage devices.

The local persistent store may be implemented using a variety of techniques in different embodiments. For example, in one embodiment, the local persistent store may be an append-only or append-mostly storage device which may be termed a local update log, in which newly updated data blocks are always appended after the data blocks of previously requested updates. Metadata for the local update log (including, for example, pointers to the last log entry and the oldest log entry that has not been deleted) may be updated in place in some embodiments (thus making the local update log append-mostly rather than append-only). In some embodiments, updates may be saved or committed to a local update log in batches, and the batch sizes may be configurable. An index (organized, for example, as a B+ tree variant) to the data blocks of a given update or batch of updates may be included in each entry of local update log in some embodiments to support rapid access to specific data blocks. In other embodiments, other types of local persistent stores may be implemented, such as a local database system where the operation principles and storage organization of the local database system may be opaque to some of the other components of the system, while providing fast local storage and indexing facilities. Transfers from local persistent stores to shared storage devices may also be performed in batches in some embodiments. When transferring data between local persistent stores and shared storage devices, in some embodiments the update manager may be configured to preserve write ordering, e.g., in accordance with write order semantics of the requesting applications.

According to some embodiments, the local update manager component may be configured to write cluster configuration information as seen at the requesting node to the corresponding local persistent store, and another component of the update manager (which may be external to the requesting node) may be configured to use the cluster configuration information in verifying cluster membership status of a node. In one embodiment employing local update logs, for example, the local update manager component may include cluster configuration information within each log entry, while in another embodiment, cluster configuration information may be written to a subset of log entries containing update contents. In some embodiments, the local update manager component may be configured to insert special cluster configuration entries (e.g., entries that contain cluster configuration information but no updated blocks) into the local persistent stores or local update logs, e.g., upon a detection of a specified condition such as a cluster configuration change. The cluster configuration information may include one or more of a cluster generation number, a list of cluster members, or a random number generated by a cluster monitor when a cluster reconfiguration occurs, and may reflect a knowledge of the state of the cluster as known at the requesting node at the time of the insertion of the cluster configuration information.

In one embodiment, after a change to the configuration of the cluster such as a partitioning of the cluster, the update manager may be configured to use a configurable quorum detection policy to detect if a node belongs to the quorum. The quorum detection policy may identify a partition as forming the quorum if, for example, a specific node (such as a designated primary node) or a specified set of nodes belong to the partition, or if a specified number or majority of the nodes belong to a partition. In some embodiments, one or more distributed applications running in the cluster may each have a corresponding update manager. That is, an update manager may be associated with each "logical cluster" comprising the instances of a distributed application, and multiple logical clusters may be incorporated within a single physical cluster.

In some embodiments, the system may include a recovery manager configured to coordinate recovery in the event of various types of failures, such as a partitioning or cascading failure where the cluster is divided into two or more partitions. After such a failure, a new quorum may be established for the cluster, and one or more nodes that were at least temporarily out of the quorum may eventually rejoin the cluster. The recovery manager may be configured to inspect the local persistent stores at each of the nodes that were outside the quorum (i.e., in an invalid partition) after the failure, and to detect whether any of the updates to their local persistent stores were made while the corresponding node was outside the quorum. An update corresponding to an invalid cluster state (e.g., if the update was performed at a point in time when its node was not part of the quorum) may be excluded from the set of updates whose contents are copied to the shared storage device when a node rejoins the quorum.

BRIEF DESCRIPTION OF THE DRAWINGS

FIG. 8 is a block diagram illustrating the entries of a local update log that includes cluster configuration entries as well as log entries that include updated data blocks, according to one embodiment.

FIG. 9 is a block diagram illustrating exemplary constituent elements of a cluster configuration entry, according to one embodiment.

Figure 1:
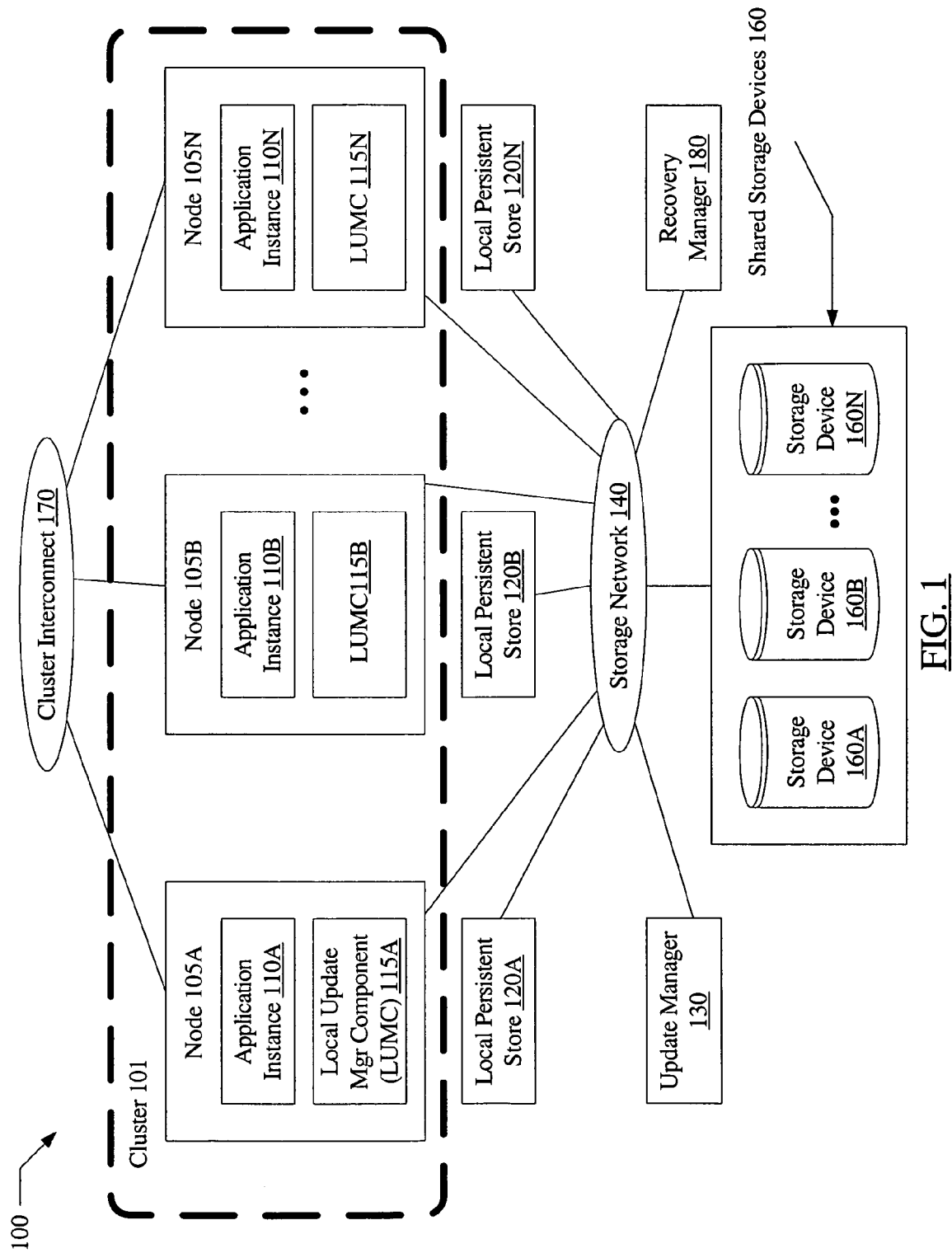
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a cluster 101 including nodes 105A, 105B, ... 105N (collectively, nodes 105), shared storage devices 160A, 160B, ... 160N (collectively, shared storage devices 160), and an update manager 130. Nodes 105 may be linked via a cluster interconnect 170. In some embodiments, shared storage devices 160 may be coupled to the nodes 105 of cluster 101 via a storage network 140. In one embodiment, system 100 may also include a recovery manager 180 configured to coordinate recovery after a cluster failure as described in further detail below. In the embodiment shown in FIG. 1, a number of applications may be configured to run at each node, including, for example, application instance 110A at node 105A, application instance 110B at node 105B, and application instance 110N at node 105N. In some embodiments, two or more of the application instances 110 may collectively form a distributed or clustered application, configured to cooperate to access and/or update shared data within shared storage devices 160. A variety of different types of applications may be executed on cluster 101, such as database management applications including on-line transaction processing, data mining and analysis, scientific/technical applications such as simulations, storage management applications including various file system, volume management, replication, backup and recovery-related applications, etc. The mix of applications at a given node 105 may include instances of one or more distributed applications, as well as single-instance applications. Some distributed applications may have instances incorporated within only a subset of nodes 105 at a given point in time.

As shown in FIG. 1, an update manager 130 may be configured to maintain a local persistent store 120 corresponding to each node 105 of the cluster, such as local persistent store 120A at node 105A, local persistent store 120B at node 105B, and so on. (In other embodiments, as described below in further detail in conjunction with the description of FIG. 12, multiple update managers 130 may be associated with a single set of nodes 105 that together form a physical cluster. For example, in one such embodiment, a distributed application may be managed as a "logical cluster" or as an "application cluster" whose nodes comprise the various application instances, and a separate update manager 130 may be associated with each distributed application or logical cluster). The local persistent stores may be implemented using any of a variety of techniques in various embodiments, each of which may provide fast local storage and indexing facilities. For example, in some embodiments, a local update log may be used for the persistent store, while in other embodiments, a local database system may be used. The operation principles and storage organization of the local persistent store may be opaque to some of the other components of the system in some embodiments. A given local persistent store 120 may comprise one or more virtual storage devices such as logical volumes in some embodiments, and may be backed by nonvolatile physical storage devices including, for example, disks or disk arrays including front-end non-volatile write caches. Shared storage devices 160 may also include one or more virtual storage devices such as logical volumes, file systems (including SAN (Storage Area Network) file systems) and the like, one or more physical storage devices, or a combination of virtual and physical storage devices in various embodiments. Local persistent store 120 as well as shared storage devices 160 may be accessible from update manager 130, for example via storage network 140.

In some embodiments, the update manager may comprise a plurality of components, some of which may be incorporated within the nodes 105 of cluster 101 for example, local update manager component (LUMC) 115A may be incorporated at node 105A, LUMC 115B at node 105B, LUMC 115N at node 105N, etc. Other components of the update manager may be incorporated at servers external to the cluster. In such embodiments, the local update manager components 115 may be responsible for redirecting updates from each node 105 to the corresponding local persistent store. For example, in response to a request from application instance 110A at node 105A to update a data block at shared storage device 160B, LUMC 115A may write the updated data blocks to local persistent store 120A, e.g., instead of writing the updated blocks directly to storage device 160B. In addition, in some embodiments, an indication of an update completion may be sent to the application instance 110A (e.g., by local update manager component 115A) as soon as the update is written to the corresponding persistent store 120A. In some such embodiments, update manager 130 may be configured to verify the cluster membership status of the updating node 105A, and transfer the update contents to the shared storage device 160 if the verification succeeds, asynchronously with respect to the update request and/or the sending of the update completion indication. The cluster membership verification and the transfer of update contents may be performed by a component of update manager 130 that is incorporated outside the nodes 105, e.g., at a server external to the cluster 101, in some embodiments. In an embodiment where the transfer of update contents is asynchronous, from the perspective of the updating application instance 110A, the perceived response time for the update to be completed may include the time taken to write the update contents to the local persistent store, but may not include the time taken to verify cluster membership status of the node 105A where the updating application instance 110A is executing, or the time taken to write the updated data to shared storage device 160. The application instance 110A may be unaware of the existence of the local persistent store 120A during normal operation in some embodiments; that is, the redirection of updates, the verification of cluster membership status, and the asynchronous transfer of updated data blocks may all occur without the application instance 110 being made aware of these operations of update manager 130.

It is noted that in the following description, the term "update manager" may be used to refer generically to all the components of update manager 130, which may include local update managers 115 as well as other components that may be incorporated outside the nodes of cluster 101. Further details regarding the functionality of update manager 130, including specific techniques that may be used by update manager 130 to verify cluster membership status and the actions that may be taken by update manager 130 if the verification of cluster membership status fails in various embodiments are provided below.

Figure 2A:
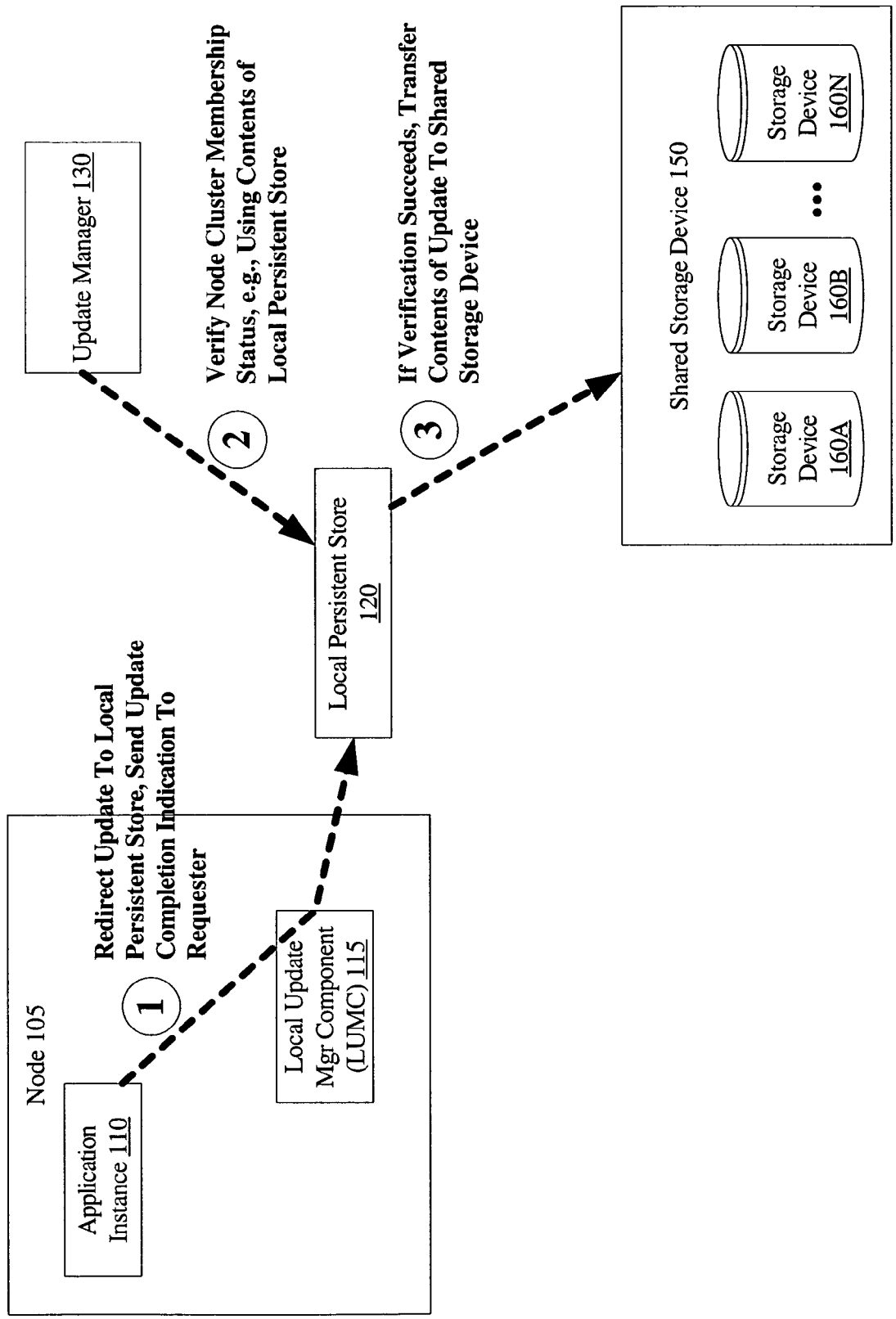
FIG. 2a is a block diagram illustrating aspects of the operation of an update manager in response to an update request, according to one embodiment.

FIG. 2a is a block diagram illustrating aspects of the operation of update manager 130 in response to an update request, according to one embodiment. As shown by the arrow labeled "1", on receiving a request to update a data block of a shared storage device 160 from an application instance 110 at a node 105, the local update manager component 120 may be configured to redirect the update to a local persistent store 120 corresponding to the node 105. In the depicted embodiment, when the update has been written to the local persistent store 120, the local update manager component 120 may send an indication of update completion to the requesting application instance. As indicated by the arrow labeled "2", update manager 130 may be configured to verify the cluster membership status of node 105, for example, by comparing some of the contents of local persistent store 120 with contents of other local persistent stores, as described below in further detail. If node 105 is found to have a valid cluster membership status, update manager 130 may transfer the contents of the updated data blocks to the shared storage device 160 to which the update request was initially targeted, as indicated by the arrow labeled "3" in FIG. 2a. In addition, as noted above, in some embodiments update manager 130 may also be configured to purge or delete portions of local persistent stores whose data has been transferred to a shared storage device 160.

Figure 2B:
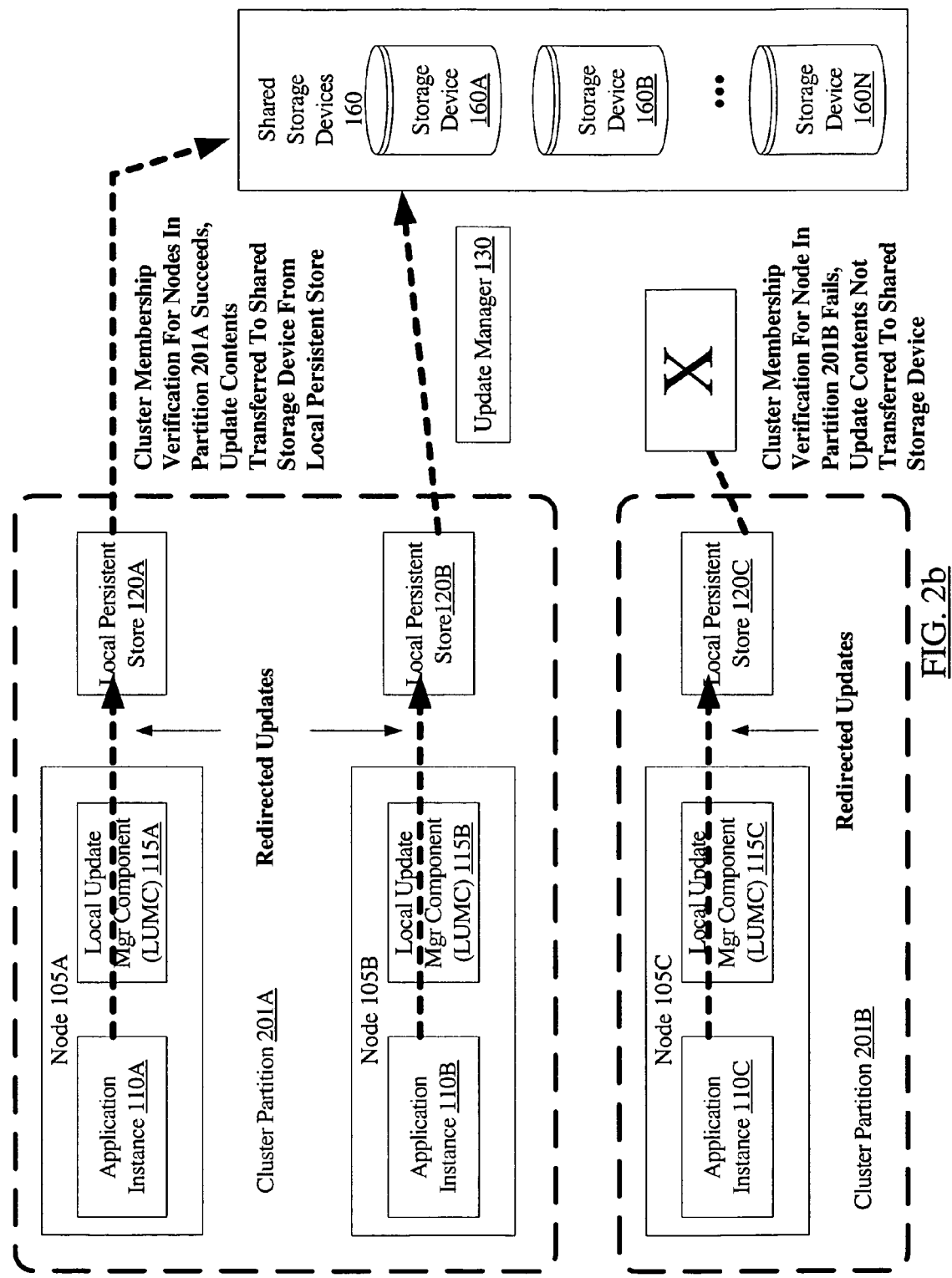
FIG. 2b is a block diagram illustrating operations that may be performed by an update manager after a partitioning of cluster, according to one embodiment.

FIG. 2b is a block diagram illustrating operations that may be performed by update manager 130 after a partitioning of cluster 101, according to one embodiment. During normal operation, each node 105 of cluster 101 may be capable of communicating with all the other nodes through cluster interconnect 170. For example, cluster management software components, such as recovery manager 180, cluster monitors, cluster lock managers, cluster transaction managers, cluster file system managers, cluster volume managers, clustered application managers, etc. may run at each node 105 and may communicate with their peer cluster management software components at other nodes as needed. In particular, a cluster monitor component at one or more nodes 105 may be responsible for monitoring the "health" or status of the cluster nodes 105 and ensuring that the nodes have a consistent view of the membership of the cluster (i.e., the list of nodes of the cluster that are currently in an operational state capable of supporting cooperative operations with all the other nodes in the list). However, in the presence of certain kinds of hardware and/or software failures, connectivity over cluster interconnect 170 may be disrupted in such a manner that cluster 101 becomes partitioned into isolated sets of nodes, which may be termed cluster partitions. A node within a given cluster partition may be able to communicate with another node within the same cluster partition, but not with a node in a different cluster partition. Each cluster partition may behave as if its nodes are the only nodes remaining operational in the cluster: e.g., from the perspective of a given node in a particular cluster partition, the only nodes that remain members of the cluster are the nodes belonging to the particular cluster partition. Such a condition, where different cluster partitions may attempt to behave independently with respect to each other, may also be termed a "split-brain" condition.

A split-brain condition can potentially lead to corruption or loss of data. For example, nodes from two different partitions may attempt to update shared data in an uncoordinated manner, thereby potentially overwriting each other's data or combining partial updates to the same data block from independent sources. In the embodiment shown in FIG. 2b, for example, a cluster initially comprising nodes 105A, 105B and 105C has been partitioned into cluster partitions 201A and 201B. Cluster partition 201A may include nodes 105A and 105B, and cluster partition 201B may include node 105C. Each node 105 may include a corresponding local update manager component 115 configured to redirect updates originating at the node to a corresponding local persistent store 120. Thus, for example, updates requested by application instance 110A at node 105A may be redirected by local update manager component 115A to local persistent store 120A, while updates requested by application node 110C at node 105C may be redirected by local update manager component 115C to local persistent store 120C.

Update manager 130 may be configured to verify the cluster membership status of each node 105, and to transfer updated data from the node to shared storage devices 160 only if the cluster membership status verification for the node succeeds. The terms "quorum" or "quorum partition" may be used herein to indicate a valid partition of a cluster—that is, a node may be determined to have a valid cluster membership status if it belongs to the quorum, and to have an invalid cluster membership status if it does not. A number of different cluster verification policies (which may also be termed quorum detection policies herein) may be used by update manager in different embodiments, as described below in further detail. For example, in one embodiment, a cluster partition may be designated as a quorum if it includes a specified node or a specified set of nodes, while in another embodiment, a cluster partition including at least a specified number of nodes may be designated as a quorum. Cluster membership status verification for a given node in such embodiments may comprise verifying that the node belongs to a quorum. In FIG. 2b, cluster membership status verification for nodes 105A and 105B may succeed, while cluster membership status verification for node 105C may fail. As a result, update manager 130 may transfer updated data blocks from local persistent stores 120A and 120B to shared storage devices 160, while updated data blocks from local persistent store 120C may not be transferred. In some embodiments applications and/or services running on node 105C, and/or node 105C itself, may be shut down.

In some embodiments, update manager 130 may be configured to preserve write ordering consistency (which may also be termed "write order fidelity") when transferring updated data blocks from local persistent stores 120 to shared storage devices 130. That is, the semantics of application instances 110 at various nodes 105 of a cluster may require that any given set of updates from the nodes be written to shared storage devices 160 in a particular sequence (or in a sequence selected from a set of allowable sequences) relative to one another, and update manager 130 may be configured to order the transfer of updated data blocks from different local persistent stores 120 to shared storage devices 160 accordingly. In some embodiments, write ordering may be implemented for batches of updates, i.e., the ordering requirements may specify the desired sequence in which batches of updates are written to shared storage, instead of specifying an order in for individual update operations. In another embodiment, write order consistency may be preserved at regular intervals rather than on a continuous basis. Any of a number of known techniques for maintaining a desired ordering of operations across the nodes of a distributed system may be used in various embodiments. For example, in one embodiment, an algorithm that employs virtual clocks, such as Lamport's clock algorithm or a variation thereof, may be used to apply updates or batches of updates from application instances 110 to shared storage devices 160 in a desired order.

In some embodiments, as indicated above, updated data blocks may be transferred in batches between local persistent stores 120 and shared storage devices 160, instead of being transferred one at a time. In addition, in some embodiments, a single update request made by an application instance 110 may include updates to a plurality of data blocks; that is, application-generated update requests may also be batched. Batch sizes and the frequency at which batches of updates are transferred to shared storage devices may be configurable parameters associated with update manager 130 in some embodiments, while in other embodiments, update manager 130 may be configured to automatically and/or dynamically adjust batch sizes and the timing of successive batched update operations based on various factors such as measured update rates at nodes 105, measured utilizations of local persistent stores 120 and/or shared storage devices 160, etc. In many implementations, batching the transfer of updated data blocks to shared storage devices 160 may help to improve the overall update throughput relative to the throughput that may have been achievable if updates were transferred one at a time.

It is also noted that in embodiments where updated data blocks are transferred to shared storage devices asynchronously with respect to notifications of update completion, a local rollback or undo of some updates may be needed at nodes whose updates are rejected by update manager 130 due to invalid cluster membership status. For example, if an application instance 110C receives a completion indication for an update "U" written to local persistent store 120C in FIG. 2b, but the contents of "U" are not transferred to shared storage devices 160 due to an invalid cluster membership status of node 105C, corrective action may eventually be required at application instance 110A for certain kinds of applications. After node 105C and/or application instance 110C is restarted and/or rejoins a valid partition (or already formed quorum) of the cluster, for example, local effects of updates (e.g., changes to one or more application data structures maintained at node 105C) whose contents were not transferred to shared storage devices 160 even though completion indications were received may have to be logically and/or physically undone in coordination with update manager 130 or with recovery manager 180.

Figure 3:
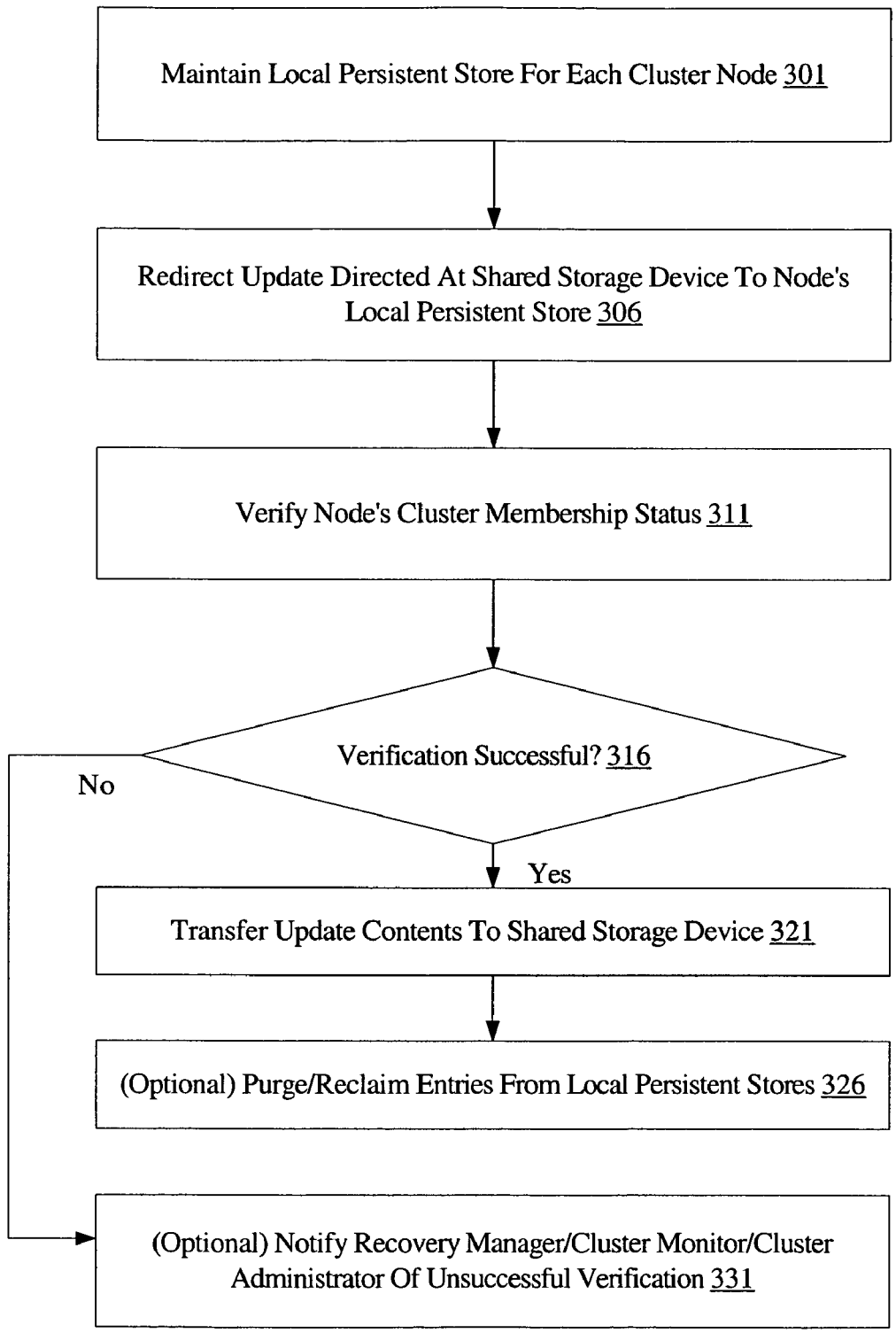
FIG. 3 is a flow diagram illustrating aspects of the operation of an update manager, according to one embodiment.

FIG. 3 is a flow diagram illustrating aspects of the operation of update manager 130 according to one embodiment. As shown in block 301 of FIG. 3, update manager 130 may be configured to maintain a local persistent store 120 corresponding to each node 105 of the cluster. On receiving a request to update one or more data blocks of a shared storage device 160, e.g. from an application such as an application instance 110 at a given node, update manager 130 may be configured to redirect the update to the local persistent store 120 corresponding to the node (block 306) (i.e., to write the updated data block or blocks to the local persistent store). As noted earlier, in some embodiments the redirection operation may be performed by a local component 115 of the update manager incorporated within the given node. It is noted that in other embodiments, redirection may be performed by a redirector component of update manager 130 running at one or more specified nodes of the cluster. That is, updates from a given node 105 may be funneled through a redirector component, which may potentially be incorporated at a different node, to the appropriate local persistent store 120. In one embodiment, a redirector component of update manager 130 may be incorporated within a server outside the cluster 101. When the updated data blocks have been written to the local persistent store 120, in some embodiments the update manager may provide an indication of update completion to the requester of the update (e.g., to application instance 110A), even though the updated data blocks may not yet have been written to shared storage devices 160 as requested by the application. In some embodiments, as described below, the update manager 130 may also be configured to include cluster configuration information as seen at the requesting node 105 (e.g., the latest cluster configuration known to a cluster monitor at the node at the time the update was requested) in the local persistent store 120. For example, in one embodiment, cluster configuration information may be bundled with each update or with each batch of updates written to the local persistent store 120, while in another embodiment, cluster configuration information may be inserted by update manager 130 into a local persistent store 120 upon the detection of a specified event such as a cluster configuration change.

After the update has been written to a local persistent store 120, update manager 130 may be configured to verify the cluster membership status of the node 105 from which the requested update originated (block 311 of FIG. 3). In embodiments where update manager 130 is configured to insert cluster configuration information as seen at the requesting node 105 into the local persistent stores 120 as described above, the inserted cluster configuration information may be used to verify the node's cluster membership status, for example by comparing the specific cluster configuration information from the requesting node with cluster configuration information obtained from other nodes or from other sources. In other embodiments, update manager 130 may use other techniques for cluster membership status verification that may not be dependent on an inclusion of cluster configuration information within local persistent stores 120, for example by attempting to communicate with a cluster monitor or with a trusted node by writing/reading from a well-known region of shared storage devices 160.

If the cluster membership status verification for the requesting node 105 succeeds, as detected in decision block 316 of FIG. 3, update manager 130 may transfer contents of the updated version of the data blocks to the shared storage device 160 to which the update was initially directed by the requesting application (block 321). As noted above, the contents of local persistent stores may be transferred to shared storage in batches in some embodiments, and parameters such as batch sizes and durations between successive batches may be tunable in such embodiments. Update manager 130 may also be configured to transfer updates to shared storage in a sequence that preserves write order fidelity in accordance with application-specific semantics, as described earlier. In some embodiments, update manager 130 may optionally be configured to perform one or more storage reclamation operations on local persistent store 120 (block 326), such as purging or deleting data blocks of local persistent store 120 whose contents have been written to a shared storage device 160, and/or returning one or more data blocks of local persistent store 120 to a pool of available storage. Such purge or reclamation operations may be performed after every transfer or after every batch of transfers in some embodiments, and may be performed periodically or according to a specified schedule or policy in other embodiments. For example, in one embodiment, update manager 130 may be configured to perform purges only if the number of outstanding transfer operations in its queue is below a specified threshold, or to perform purges after specified time intervals such as once every five minutes.

If the cluster membership status verification for the requesting node 105 fails, update manager 130 may not transfer the update contents to shared storage in some embodiments. In addition, in one embodiment, update manager 130 may optionally be configured to respond to the failure of the cluster membership status verification by sending a notification, for example to recovery manager 180 or to a cluster monitor or to a cluster administrator (block 331). The notification may include the identity of the node or nodes whose cluster membership status verification failed, as well as the current cluster configuration as viewed by such nodes in some embodiments. In some embodiments, the update manager may include a request for a particular cluster reconfiguration operation (such as a disabling of the nodes 105 whose cluster membership status was found invalid) in the notification. In other embodiments, the update manager may be authorized to perform one or more reconfiguration operations on its own in response to the detection of inappropriate or unexpected cluster membership status, such as disabling one or more application instances 110 or nodes 105. In one embodiment, upon detecting invalid cluster membership status for a given node 105, update manager 130 may be configured to detect potential additional nodes whose cluster membership status may also be suspect (e.g., using cluster configuration information as viewed from the node whose membership is found invalid), and to communicate the identities of such suspect nodes to a cluster monitor or to an administrator. A variety of techniques may be used by update manager 130 to notify the cluster monitor or administrator in different embodiments, such as, for example, sending one or more messages over a TCP/IP (Transmission Control Protocol/Internet Protocol) connection if TCP/IP connectivity exists, writing to a well-known location within shared storage devices 160, updating a status log, etc.

Figure 4:
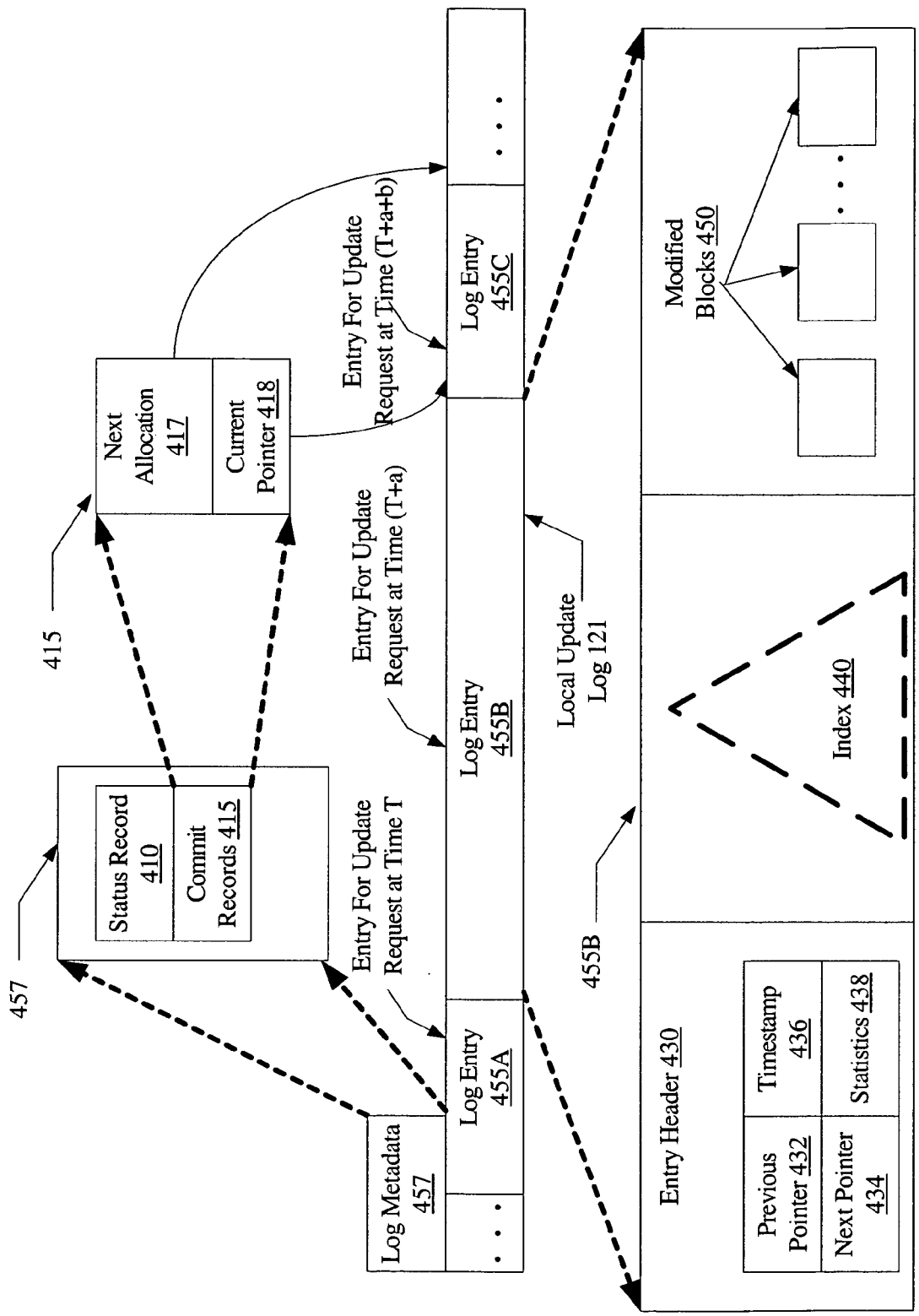
FIG. 4 is a block diagram illustrating an exemplary structure of a local update log, according to one embodiment

In some embodiments, local persistent stores 120 may be implemented as log structured (i.e., append-only or append-mostly) devices, which may be termed "local update logs" herein. Local update logs may be implemented using a variety of storage devices in different embodiments, such as using one or more files in a file system, one or more logical volumes, etc. In one embodiment, in redirecting the updates requested by an application at a node 105, update manager 130 may be configured to append the one or more data blocks of the update to the local update log corresponding to the node. That is, for two updates U1 and U2 requested at times T1 and T2, respectively, where T2>T1, the data blocks updated by U2 may be stored at addresses within the local update log that are logically and/or physically higher than the addresses at which data blocks updated by U1 are stored. FIG. 4 is a block diagram illustrating an exemplary structure of a local update log 121 according to one embodiment where update manager 130 appends updated data blocks to the log in the sequence in which the corresponding update requests are received.

In the embodiment depicted in FIG. 4, the local update log 121 comprises a sequence of log entries 455 (e.g., 455A, 455B and 455C) and log metadata 457. Successive log entries 455 include the data blocks modified by update requests (or batches of update requests) received at successively later points of time. For example, log entry 455A correspond to an update request received at time T, log entry 455B to an update request received at time (T+a), and log entry 455C to an update request received at time (T+a+b). As described below in further detail, in some embodiments, additional log entries comprising cluster configuration entries may also be inserted into local update logs 121. As shown, log metadata 457 may comprise a status record 410 and one or more commit records 415. Status record 410 may include a variety of status information for local update log 121, including for example pointers to the start and end of physical storage space allocated for local update log 121, a pointer to the most recent log entry 455 whose data blocks have been copied or transferred to shared storage devices 160, a timestamp indicative of the last modification to the local update log 121, a pointer to a most recent cluster configuration information stored in the local update log, etc. Commit records 415 may include a current pointer 418 to the most recent log entry 455 that has been successfully committed or saved within the local update log 121, and a next allocation pointer 417 to the next available allocated space within the local update log (e.g., an offset where a next log entry 455 may be appended). It is noted that in some embodiments, log metadata 457 may include different component elements than those illustrated in FIG. 4, and that in some embodiments, log metadata 457 may be omitted.

Each log entry 455 may contain three kinds of information in the depicted embodiment: an entry header 430, an index 440, and a set of one or more modified blocks 450 of the corresponding update request or batch of update requests. In other embodiments, as described in further detail below, one or more log entries may also include cluster configuration information. As shown for entry 455B, an entry header 430 may contain a previous pointer 432 and a next pointer 434, respectively pointing to a previous log entry (e.g., 455A) and a next log entry (e.g., 455C) within local update log 121. In addition, entry header 430 may also contain one or more timestamps 436 indicative of a time at which the corresponding entry 455 was created or committed, as well as statistics or accounting information 438. Index 440 may be used to speed up searches for recently modified data blocks 450 of the local update log 121 based on block address. Such searches may be performed, for example, by update manager 130 prior to transferring the contents of updates to shared storage devices 160, and also by other applications that may be provided access to local update logs 121 in some embodiments. A number of different types of index structures may be used to implement index 440 in different embodiments, such as variants of B-trees, B+-trees and the like.

Numerous modified data blocks 450 may be included within a log entry 455, corresponding to a batch of updates requested by one or more applications or application instances 110. As noted earlier, the manner in which updates requested by applications are grouped or batched may be configurable (e.g., via one or more input parameters provided to update manager 130) in some embodiments. For example, update manager 130 may be configured to batch all outstanding update requests received during a specified time interval (e.g., 100 milliseconds) within one log entry 155 in one embodiment. In other embodiments the size of a batch may be based on a combination of factors, such as a specified number of updated blocks per batch and a maximum delay between the time an update to a block is requested and the time it is committed in a log entry 455. In such an embodiment, for example, a log entry 455 may be created as soon as either condition is met: either the specified number of updated blocks has accumulated, or the maximum allowed delay has elapsed. Previous pointers 432 and next pointers 434 support sequential access to the log entries 455 in order (or reverse order) of requested update times. It is noted that in some implementations, one or more of the elements of header 432, such as previous pointer 432, next pointer 434, timestamp 436 or statistics 438 may be omitted. In other implementations, index 430 may be omitted from log entries 455.

Figure 5:
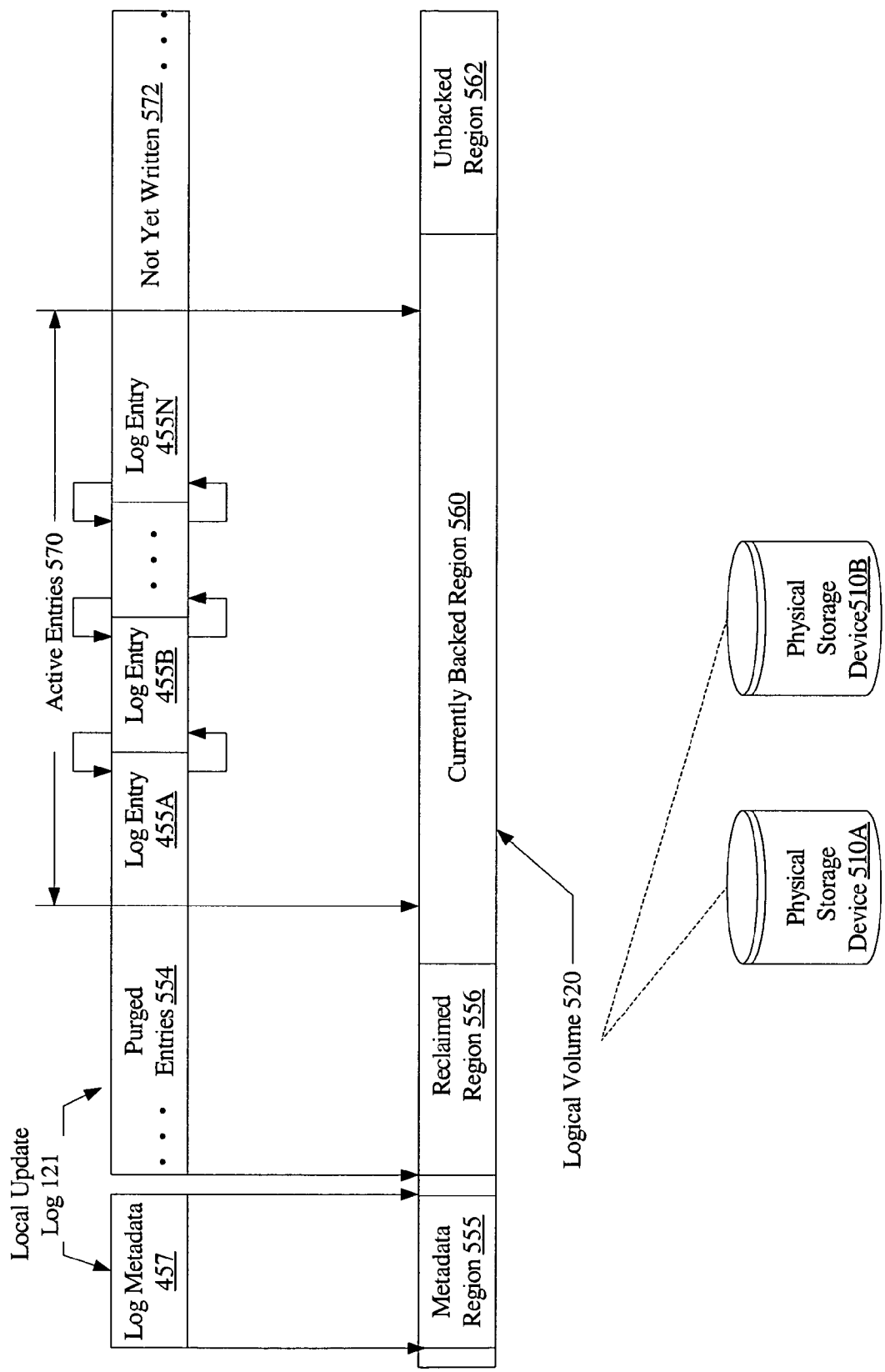
FIG. 5 is a block diagram illustrating a mapping between the constituents of a local update log and a logical volume, according to one embodiment.

According to one embodiment, a local update log 121 may be maintained as a dedicated logical volume, such as a logical volume managed by the VERITAS Volume Manager™ from VERITAS Software Corporation. FIG. 5 is a block diagram illustrating a mapping between the constituents of a local update log 121 and a logical volume 520 according to such an embodiment. As shown, log metadata 457 may map to a metadata region 555 of the logical volume 520, while log entries 455A . . . 455N, which may be termed "active" log entries 570 for reasons described below, may be mapped to a currently backed region 560 of logical volume 520. In the embodiment depicted in FIG. 5, update manager 130 may be configured to purge or delete log entries whose contents have already been transferred to shared storage devices 160, and to free up the storage used for such obsolete log entries. In such an embodiment, the set of log entries 455 that currently have allocated backing storage (e.g., 455A-455N in FIG. 5) may be termed "active" log entries. As obsolete log entries are purged or removed from local update log 121 (e.g., purged entries 554), the corresponding regions of logical volume 520 (i.e., region 556) may be reclaimed or freed. Such reclaimed or freed entries may be used to back future log entries (e.g., entries from "not yet written" region 572). Logical volume 520 may be implemented as a striped logical volume in one embodiment, including two or more physical storage devices 510A and 510B across which the volume data is striped. In some embodiments, logical volume 520 may also employ mirroring, instead of or in addition to striping. As shown in FIG. 5, the boundaries of currently backed region 560 may not match exactly with the boundaries of active log entries 570 in some embodiments, for example because the size of currently backed region 560 may be modified asynchronously with respect to changes in active log entries 570, and/or because the units in which storage is added or removed from the backed region may differ from the sizes of log entries 455. A variety of allocation policies may be used to manage the size of backed region 560 of logical volume 520 in different embodiments. For example, in one embodiment an allocation policy may include parameters governing the initial size of allocated region 560 and the size of subsequent allocation increments, while in another embodiment an allocation policy may also require that a certain minimum number or proportion of unmapped blocks be maintained ready for newly created log entries 455.

Figure 6:
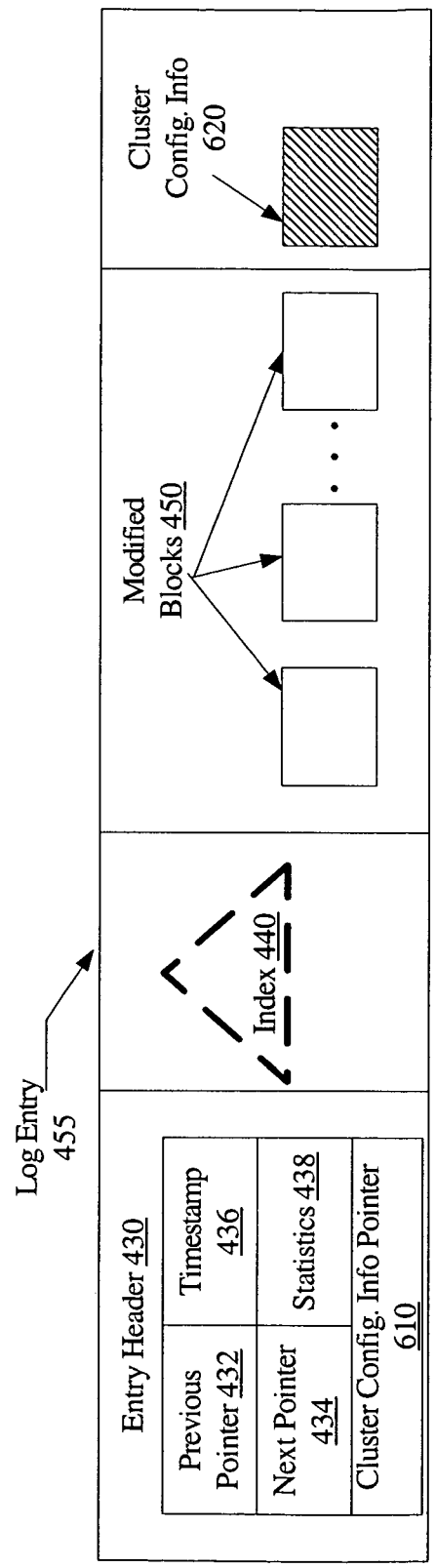
FIG. 6 is a block diagram illustrating an exemplary organization of a log entry containing updated data blocks as well as cluster configuration information, according to one embodiment.
Figure 7:
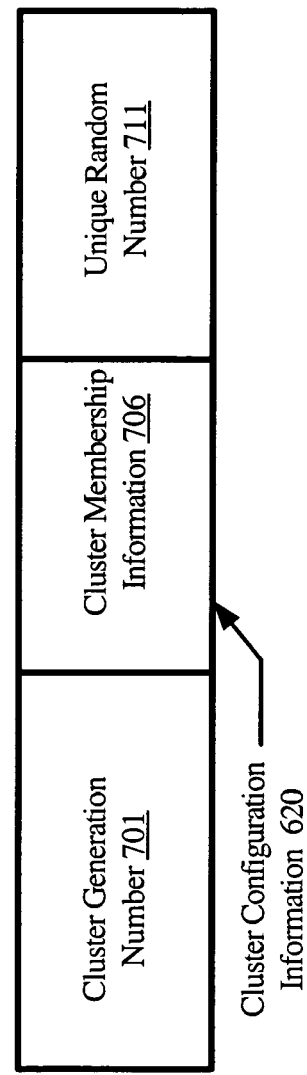
FIG. 7 is a block diagram illustrating exemplary constituent elements of cluster configuration information, according to one embodiment.

As noted earlier, in some embodiments, update manager 130 may be configured to insert cluster configuration information available at a node 105 into the corresponding local persistent store 120, such as a local update log 121, or a local database system. In embodiments employing local update logs, the cluster configuration information may be inserted into log entries 455 that also contain updated data blocks, and/or into special cluster configuration log entries that only contain cluster configuration information. In embodiments where other types of local persistent stores are employed, cluster configuration information may be inserted into the appropriate structures, such as database records. FIG. 6 is a block diagram illustrating an exemplary organization of a log entry 455 containing updated data blocks 450 as well as cluster configuration information 620, according to one embodiment. FIG. 7 is a block diagram illustrating exemplary constituent elements of cluster configuration information 620, according to another embodiment. As shown in FIG. 7, the cluster configuration information may include a cluster generation number 701, cluster membership information 706, and/or a unique random number 711.

As noted earlier, a cluster monitor or other component of cluster management software may be responsible for managing cluster membership changes and other cluster reconfigurations. For example, it may be the responsibility of the cluster monitor to assign a node identifier (typically, a small integer) to each node 105, and to maintain a cluster membership list that identifies the currently operational nodes 105 of the cluster. When a node 105 joins or leaves the cluster, the cluster monitor may be configured to generate a new membership list that reflects the change. The changed membership list may be communicated to the current set of nodes by the cluster monitor. In some embodiments, the cluster monitor may be configured to associate a cluster generation number with each configuration membership change of the cluster, and communicate the cluster generation number to each node 105 along with the membership list. The cluster generation number may be increased (e.g., incremented by one) each time the cluster membership changes, so that a given cluster generation number uniquely identifies a particular cluster configuration change. In the embodiment depicted in FIG. 6, whenever a log entry 455 is written to local update log 121 corresponding to a given node 105, the current cluster generation number 701 known at the node 105 may be included within cluster configuration information 620 of the log entry. A representation of current cluster membership information 706 (e.g., a list of node identifiers, IP addresses, or the like) as known at the node 105 may also be included in some embodiments. The header 430 of log entry 455 may also include a pointer 610 to the cluster configuration information 620 included within the log entry in some implementations.

In some implementations, where for example a cluster 101 includes a node 105 designated as a primary node or as a volume server for a distributed storage virtualization system, the primary node or volume server may be configured to generate a unique random number 711 whenever a cluster membership change is detected by the primary node, and the unique random number 711 may also be included in the cluster configuration information 620. It is noted that in different embodiments, any combination of cluster generation number 701, cluster membership information 706, and unique random number 711 may be included in cluster configuration information 620. In some embodiments, other information indicative of a current cluster configuration may be included in addition to, or in place of, the constituents of cluster configuration information 620 shown in FIG. 7. Cluster configuration information 620 may be included within each log entry 455 in some embodiments, and within selected log entries (e.g., in one log entry 455 every five minutes, or in log entries generated immediately after cluster configuration changes) in other embodiments.

Cluster configuration information 620 included in a given local persistent store 120 of a node 105 may be used by update manager 130 to verify cluster membership status of node 105 in some embodiments. In a partitioned cluster or a cluster in a split-brain condition, the cluster configuration information 620 written from nodes of a given partition may differ from the cluster configuration information written from nodes of a different partition. As described below in further detail in conjunction with the description of FIG. 10, update manager 130 may be configured to compare cluster configuration information 620 from multiple nodes to determine whether the cluster has been partitioned and/or to help identify nodes with a valid cluster membership status, prior to transferring contents from a local persistent store 120 to shared storage devices 160. In the partitioned cluster illustrated in FIG. 2*b*, for example, cluster configuration information for node 105A may be consistent with cluster configuration information for node 105B, but may differ from the cluster configuration information for node 105C (e.g., the cluster generation counts, membership information and/or random numbers may differ). By comparing the cluster configuration information associated with outstanding updates at nodes 105A and 105B with the cluster configuration information associated with outstanding updates at node 105C, update manager 130 may be able to detect a split-brain condition and the existence of partitions 201A and 201B. Update manager 130 may then be configured to designate a particular partition (such as partition 201A) as the quorum according to a specified configurable quorum detection policy, and to only apply the updates of the quorum to shared storage devices 160 instead of applying updates from all the partitions. In this way, update manager 130 may avoid data corruption that may have resulted had contents of updates from more than one partition been transferred to shared storage devices 160. Further details of different partition validity policies are provided below.

In some embodiments employing local update logs 121, instead of including cluster configuration information within each or a plurality of log entries 455 that contain updated data blocks, update manager 130 may be configured to insert special cluster configuration entries (which may not contain data blocks corresponding to update requests) into the local update logs 121. FIG. 8 is a block diagram illustrating the entries of a local update log 121 that includes cluster configuration entries 805A and 805B as well as log entries 455 that include updated data blocks, according to one embodiment.

Exemplary constituent elements of a cluster configuration entry 805 are shown in FIG. 9, according to another embodiment. It is noted that similar techniques may also be employed in embodiments where other types of persistent local stores are employed—e.g., special cluster configuration records may be inserted into a local database in embodiments where local databases are used as persistent stores instead of local update logs 121.

Update manager 130 may be configured to insert cluster configuration entries 805 into a local persistent store 120 such as local update log 121 in accordance with a variety of configuration saving policies in different embodiments. According to one configuration saving policy, update manager 130 may be configured to generate and insert a new cluster configuration entry 805 only when a cluster configuration change occurs. According to another policy, update manager 130 may insert a cluster configuration entry 805 according to a specified schedule, e.g., once every five minutes, or when it detects a cluster reconfiguration event (whichever occurs earlier). In some embodiments employing local update logs 121, as shown in FIG. 8, log metadata 457 may include a cluster configuration information pointer 810 that points to the latest cluster configuration entry 805B present in the local update log. Such a pointer may help update manager 130 quickly determine the latest cluster configuration information known at the node 105 that corresponds to the local update log 121.

In one embodiment, as shown in FIG. 9, cluster configuration entries 805 may be linked to each other via next and previous pointers (in a manner similar to the way next pointer 434 and previous pointer 432 link successive log entries 455 as shown in FIG. 4). Thus, in FIG. 9, cluster configuration entry 805 includes a next CCE (cluster configuration entry) pointer 901 and a previous CCE pointer 906, respectively pointing to the next and previous cluster configuration entries 805 within local update log 121, in addition to cluster configuration information 620 (e.g., a cluster generation number 701, etc.). It is noted that in embodiments such as those of FIG. 8, multiple log entries 455 may be associated with a single cluster configuration entry 805. For example, in one embodiment, when verifying the cluster membership status corresponding to log entries 455C and/or 455D, update manager 130 may be configured to inspect the cluster configuration information in cluster configuration entry 805A (since 805A contains the latest cluster configuration information inserted into local update log 121 prior to the updated data blocks of log entries 455C and 455D). In some embodiments, a component of cluster management or some other software (such as a cluster monitor) may be configured to insert cluster configuration entries 805 into local update logs 121, instead of or in addition to update manager 130.

Figure 10:
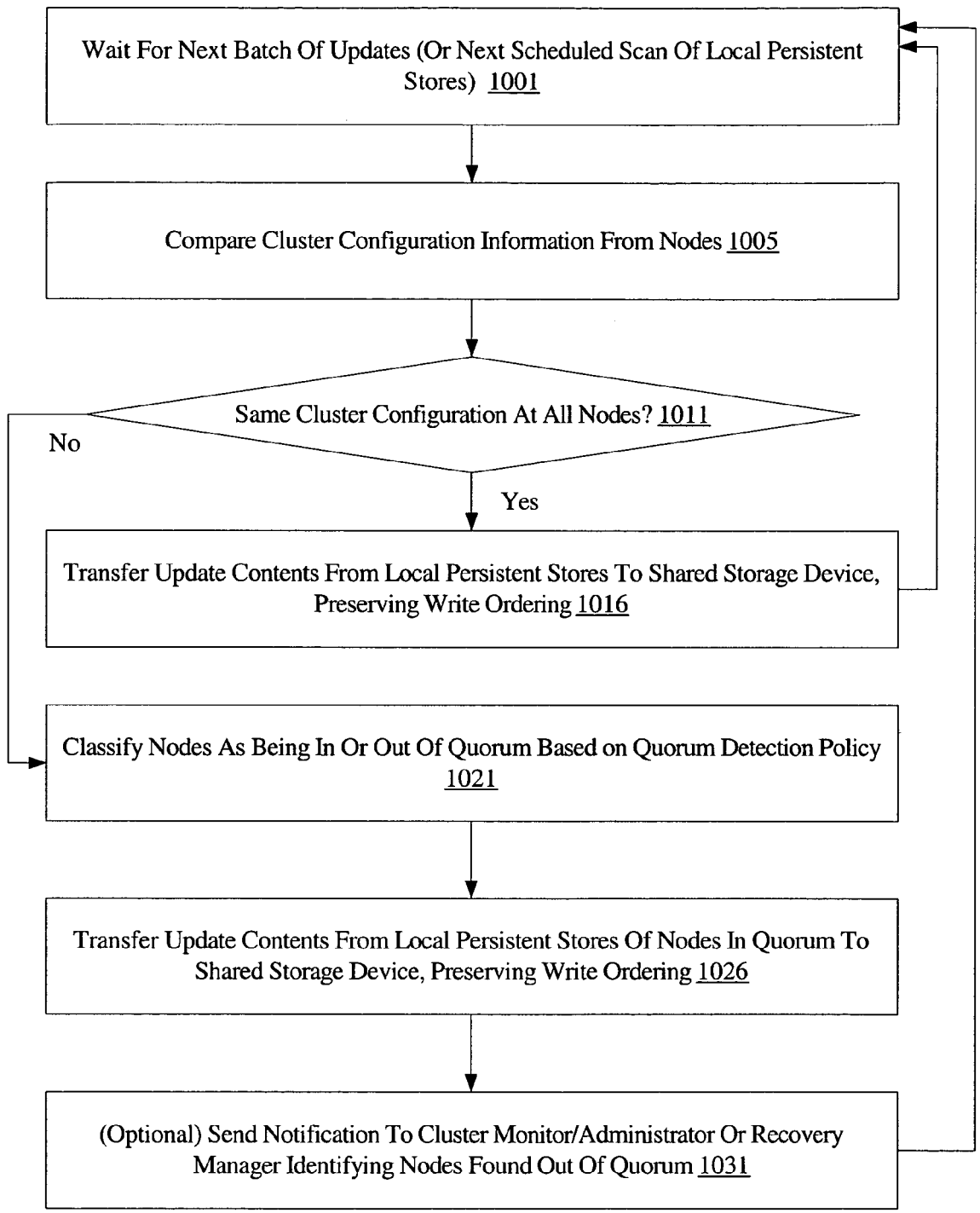
FIG. 10 is a block diagram illustrating further aspects of the operation of update manager, according to one embodiment.

FIG. 10 is a block diagram illustrating further aspects of the operation of update manager 130 according to one embodiment. In the embodiment of FIG. 10, update manager 130 may be configured to transfer update contents in batches from local persistent stores 120 to shared storage devices 160, and to use cluster configuration information 620 to help verify cluster membership status. As shown in block 1001 of FIG. 10, update manager 130 may be configured to wait for the next batch of updates to be requested. In some embodiments, update manager 130 may be configured to periodically sweep through the local persistent stores 120 of cluster 101 in sequence, generating a list of outstanding update requests (i.e., requests whose data blocks have not been transferred or copied to shared storage devices 160) at each node. In other embodiments, a local update manager component 115 may be configured to notify components of update manager 130 responsible for update transfer to shared storage when a batch of update requests is outstanding at a node 105. Prior to transferring contents of any updates to shared storage, update manager 130 may be configured to compare cluster configuration information 620 corresponding to the outstanding updates from different nodes (block 1006). In some embodiments, update manager 130 may be configured to compare the latest available cluster configuration information 620 from each accessible node 105 (including nodes that have no outstanding updates), while in other embodiments, update manager 130 may be configured to compare the latest available cluster configuration information 620 from a subset of the nodes (e.g., from nodes that have outstanding updates and from a primary node). In one embodiment, each distributed application running in cluster 101 may have a designated update manager 130 associated with it. In such an embodiment, the update manager 130 for a particular distributed application may be configured to compare cluster configuration information 620 only from the nodes 105 where instances of the distributed application are running. As noted earlier, a difference in cluster configuration information obtained from different nodes may indicate a partitioned or split-brain cluster.

If the cluster configuration information 620 from the different nodes is identical (as detected in decision block 1011), update manager 130 may determine that the cluster is not partitioned, and that all the nodes have a valid membership status. Update manager 130 may then transfer the contents of the outstanding updates identified from all the nodes to shared storage devices 160 (block 1016), while preserving write order fidelity as described earlier.

If the cluster configuration information 620 from some nodes 105 differs from that of others (e.g., if the cluster generation number 701, cluster membership information 706, and/or the unique random number 711 differs from one node to another), update manager 130 may deduce that a cluster partitioning has occurred. Update manager 130 may be configured to classify the nodes 105 into valid and invalid partitions 201 (i.e., being in or out of the quorum), based on a configurable quorum detection policy (block 1021). First, update manager 130 may be configured to identify the partitions of the cluster. All the nodes that share identical cluster configuration information 620 values may be considered to form a distinct partition 201 (i.e., if, and only if, two nodes have the same cluster configuration information, they may be considered to belong to the same partition 201). A number of different configurable quorum detection policies may be used in different embodiments. For example, in one embodiment, update manager 130 may be configured to designate a partition 201 as being the quorum if it has a specified number of nodes 105 or a majority of nodes of the cluster. In such an embodiment, for example, the number of nodes required for a partition to be designated as the quorum may be configurable, for example using a configuration file or other input mechanism associated with update manager 130 or with other components of cluster management software. In another embodiment, a partition 201 may be designated as the quorum if a specified node (such as a primary or master node or a volume server) belongs to the partition. In a third embodiment, update manager 130 may be configured to inform a cluster monitor or a system administrator when partitioning is detected, and await instructions from the cluster monitor or system administrator that identify the quorum. In one specific embodiment, upon detecting cluster partitioning, update manager 130 may be configured to suspend the transfer of any further updates to shared storage devices 160 until a specified condition is detected (e.g., until all nodes that are not part of the quorum have been disabled, or have rejoined the cluster after being disabled, such that all the operational nodes with outstanding updates again have consistent cluster configuration information).

After the quorum has been identified, update manager 130 may be configured to transfer the contents of outstanding updates from the nodes of the quorum (if any) to shared storage devices 160, while preserving write ordering requirements (block 1026). Optionally, in some embodiments, update manager 130 may also be configured to send a notification to recovery manager 180, a cluster monitor or other component of clustering software, and/or to a system administrator, identifying nodes having been determined not to be in quorum (block 1031). In some embodiments, update manager 130 may also be configured to perform one or more cluster reconfiguration operations, e.g., to disable or shut down nodes 105 (or shut down applications on nodes 105) found to be out of the quorum. After the updates in the current batch or current sweep have been dealt with as described above, update manager 130 may be configured to wait for the next batch of updates or for the next scheduled sweep of the operational nodes (i.e. to repeat the operations starting at block 1001). It is noted that some of the operations illustrated in FIG. 10 may be performed in a different order, or omitted, in some embodiments—e.g., the operations corresponding to block 1031 may be performed prior to operations corresponding to block 1026 in one embodiment.

In some embodiments, system 100 may include a recovery manager to coordinate a recovery of the cluster in the event of various types of failures, such as a partitioning or cascading failure where the cluster is divided into two or more partitions (e.g., partitions 201A and 201B shown in FIG. 2). After such a failure, a new quorum may be established for the cluster, and one or more nodes 105 that were at least temporarily out of the quorum may eventually rejoin the cluster. Recovery manager 180 may be configured to inspect the local persistent stores 120 at each of the nodes that were outside the quorum (i.e., in an invalid partition) after the failure, and to detect whether any of the updates to their local persistent stores 120 were made while the corresponding node 105 was outside the quorum. In some implementations, for example, the recovery manager 180 may be configured to identify a last known valid or stable state of the cluster prior to the partitioning, and to use cluster configuration information 620 included in the local persistent stores to determine whether a particular update corresponds to a valid cluster state or not. An update corresponding to an invalid cluster state (e.g., if the update was performed at a point in time when its node was not part of the quorum) may be excluded from the set of updates whose contents are copied to the shared storage device 160 when a node rejoins the quorum.

In some implementations, the recovery manager 180 may be configured to examine the local persistent store 120 at a node that left the quorum prior to the node rejoining the quorum, while in other implementations the recovery manager may examine the local persistent store 120 after the node rejoins. The recovery manager 180 may be configured to scan several local persistent stores 120 in parallel in some embodiments to detect such invalid updates, e.g., in order to make cluster recovery more efficient. In some implementations, not all the updates that were performed after the partitioning may be excluded from the shared storage device 160; instead, for example, the recovery manager may be configured to exclude only data blocks that were updated from multiple nodes after the partitioning failure.

Figure 11:
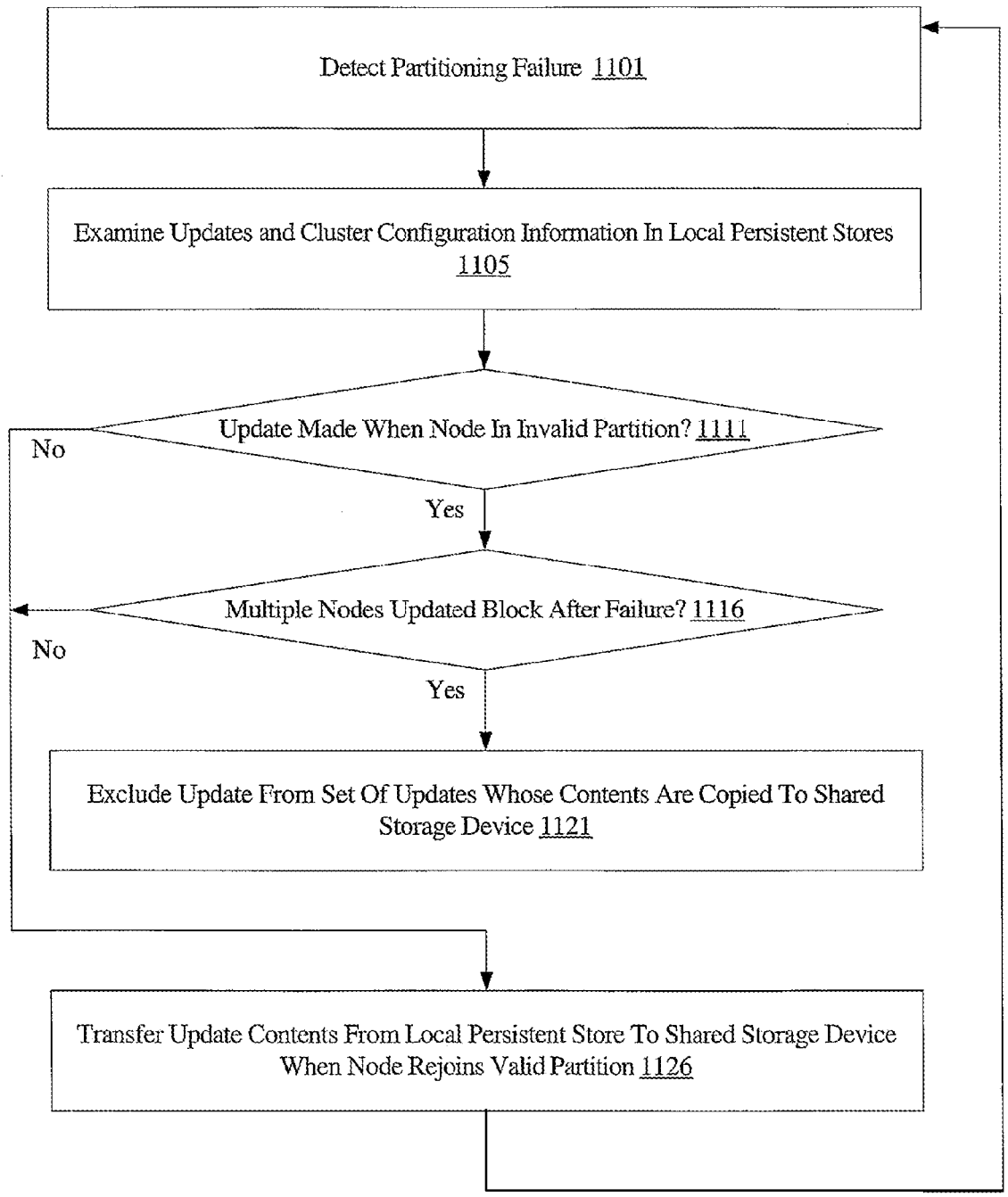
FIG. 11 is a block diagram illustrating aspects of the operation of a recovery manager, according to one embodiment.

FIG. 11 is a flow diagram illustrating aspects of the operation of recovery manager 180 according to one embodiment. In the illustrated embodiment, recovery manager 180 may also be configured to detect the occurrence of a partitioning failure (block 1101 of FIG. 11), e.g., based on any of a variety of techniques such as monitoring node status via heartbeat messages or based on a communication from update manager 130. After the detection of the failure, recovery manager 180 may be configured to examine the updates and cluster configuration information stored in local persistent stores 120 (block 1106). In some implementations, any update that is found to have been performed when its node was in an invalid partition (e.g., out of quorum) (as detected in decision block 1111) may be excluded from a set of updates whose contents are copied to shared storage device 160 (block 1121) when the node rejoins the quorum. In other implementations, as noted above, the recovery manager may be configured to exclude only the updated blocks that were modified from multiple nodes after the failure (as detected in block 1116). Contents of updates that pass the test for inclusion in the shared storage device 160 (e.g., updates whose blocks were written to a local persistent store 120 while the corresponding node 105 was in quorum, or whose blocks were not written to from more than one out-of-quorum node) may be copied to the shared storage device 160 when the node rejoins the quorum or valid partition (block 1126).

Figure 12:
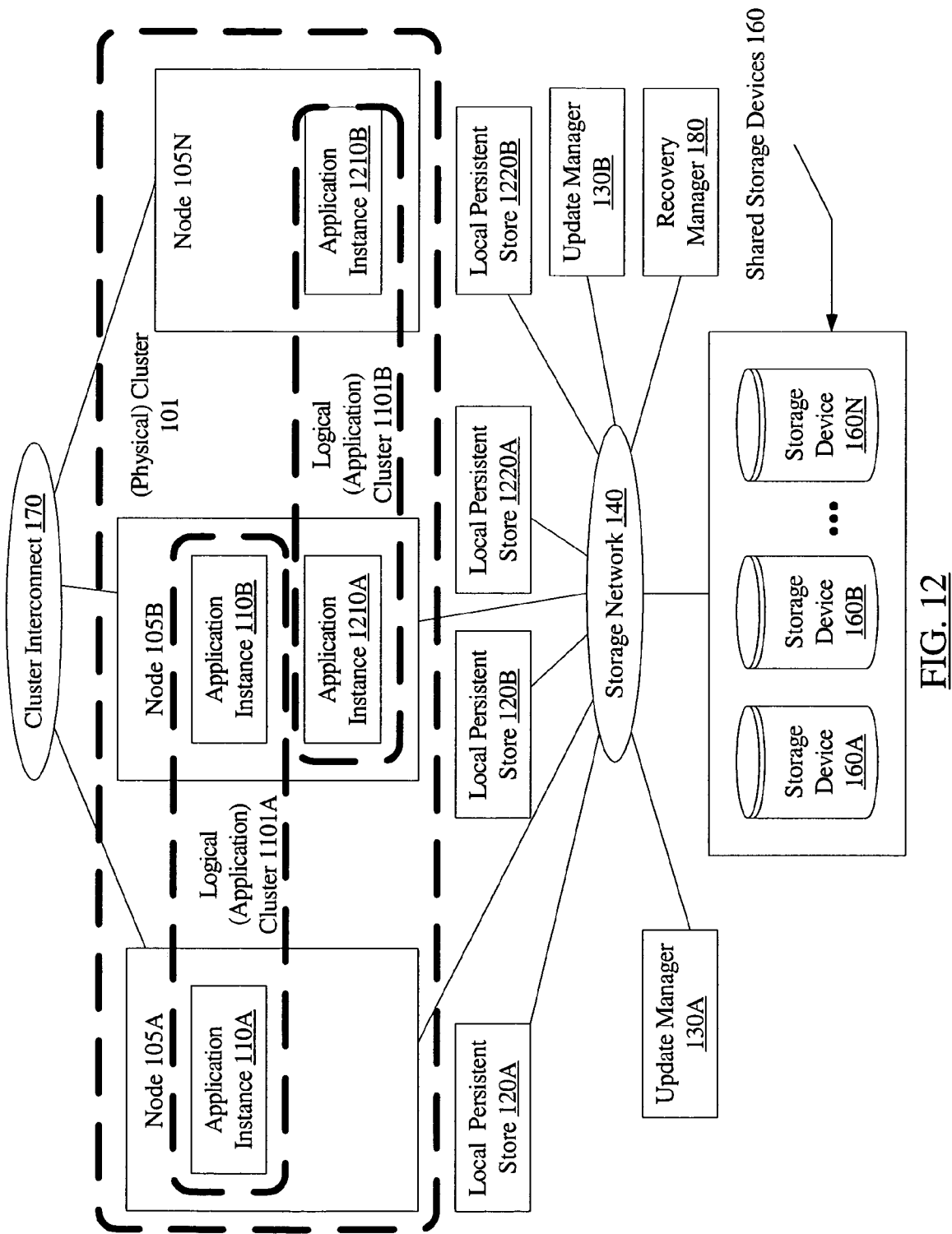
FIG. 12 is a block diagram illustrating one embodiment in which multiple update managers may be deployed to manage updates from the nodes of a single physical cluster.

FIG. 12 is a block diagram illustrating one embodiment in which multiple update managers 130 may be deployed to manage updates from the nodes 105 of a single physical cluster. As noted earlier, a number of different applications, some of which may be distributed applications, may be deployed within a given cluster of nodes 105. In the embodiment depicted in FIG. 11, for example, application instances 110A and 110B form a first distributed application, while application instances 1210A and 1210B form a second distributed application. The set of instances of a distributed application may be termed a "logical cluster" or an "application cluster" in some environments, and each application instance of a logical cluster may be termed a "logical node" or an "application node". The nodes 105 of the cluster, at each of which one or more application instances may be incorporated, may be termed "physical" nodes, while the cluster 101 of physical nodes 105 may itself also be termed a "physical cluster" to distinguish it from logical clusters. In the embodiment shown in FIG. 11, application nodes (or instances) 110A and 110B belong to logical cluster 1101A, while application nodes 1210A and 1210B belong to logical cluster 1101B. In general, an application instance or node (e.g., instances 110A, 110B, 1210A and 1210B in FIG. 11) of a logical cluster (e.g., 1101A or 1101B) may be mapped to any physical node 105 of the cluster. In some cases, instances of multiple logical clusters 1101 may be incorporated within a single physical node 105. For example, in FIG. 11, application node 110B of logical cluster 1101A and application node 1210A of logical cluster 1101B may both be incorporated within physical node 105B, while application node 110A of logical cluster 1101A may be incorporated within physical node 105A and application node 1210B of logical cluster 1101B may be incorporated within physical node 105C. It is noted that while local update manager components 115 are not shown in FIG. 11 for clarity, one or more local update manager components may be executed at each node 105 in some embodiments. It is noted that logical cluster 1101A and 1101B may each include additional application nodes, not shown in FIG. 11, some of which may be incorporated within additional physical nodes 105, also not shown in FIG. 11.

In one embodiment where instances of distributed applications are organized as logical clusters 1101, such as the embodiment of FIG. 11, a separate update manager 130 may be associated with each logical cluster. For example, in FIG. 11, update manager 130A may be associated with logical cluster 1101A, while update manager 130B may be associated with logical cluster 1101B. Each update manager 130 may be responsible for redirecting updates from their respective application nodes to local persistent stores 120, for verifying cluster membership status of the requesting application node 110 or 1210 (and/or physical node 105), and for transferring contents of the updates to shared storage devices 160 if the cluster membership status verification succeeds. In other embodiments, a given update manager 130 may be associated with, and manage update redirections and transfers to shared storage for, any specified number of distributed or clustered applications.

Just as a physical cluster 101 may get partitioned and/or reach a split-brain condition in the event of certain types of failures, a logical cluster 1101 may similarly become partitioned and/or reach a split-brain condition. In some embodiments, cluster membership status verification may include checking whether an application node 110 or 1210 belongs to the quorum of a logical cluster 1101, while in other embodiments, the cluster membership status verification may include checks at the physical node level i.e., by verifying that the physical node 105 at which a given application node is executing forms part of a valid physical cluster partition. In general, the kinds of update management operations performed by an update manager 130 described above in the context of a physical cluster 101 (e.g., the operations of update manager 130 corresponding to FIG. 1-FIG. 10) may also be performed by an update manager 130 for a logical cluster 1101. In some embodiments, for example, a separate local persistent store 120 may be established for each logical cluster 1101 whose application instance is incorporated at a given physical node 105. Thus, as shown in FIG. 11, update manager 130A, associated with logical cluster 1101A, may be configured to maintain a local persistent 120A for application instance 110A at node 105A and a local persistent store 120B for application instance 110B at node 105B. Update manager 130B, associated with logical cluster 1101B, may be configured to maintain a local persistent store 1220A for application instance 1210A at node 105B and a local persistent store 1220B for application instance 1210B at node 105C. Thus, in the depicted embodiment, multiple local persistent stores (120B and 1220A) may be maintained for application instances incorporated at a single physical node 105. Similarly, in some embodiments, multiple local update manager components 115 may be executed at each physical node 105 of a cluster, one for each update manager associated with an application instance 110 or 1210 at the node 105. It is noted that in other embodiments, multiple update managers 130 may be configured to cooperate to use a single logical persistent store 120, such that, for example, each physical node 105 of the cluster has a single associated logical persistent store, independent of the number of distributed application instances incorporated at the physical node. Cluster configuration information 620 inserted into a local persistent store 120 may include information associated with a logical cluster 1101, a physical cluster 101, or a combination of information associated with physical and logical clusters in different embodiments.

Figure 13:
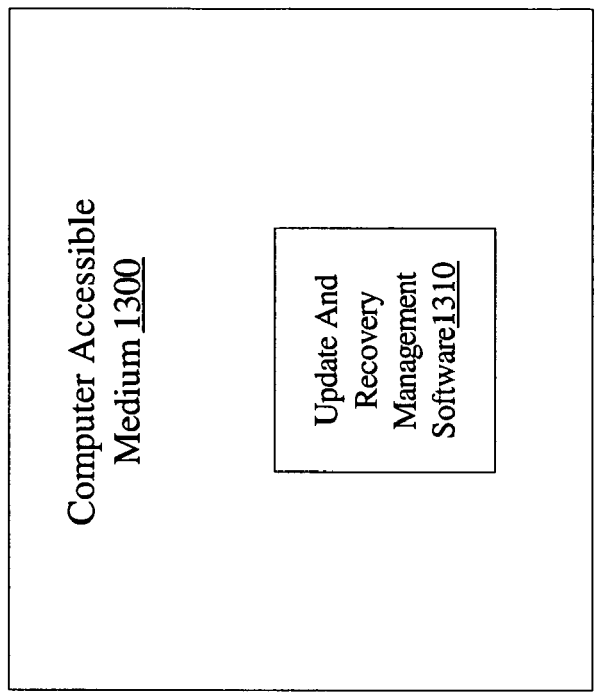
FIG. 13 is a block diagram illustrating a computer accessible medium according to one embodiment.

FIG. 13 is a block diagram illustrating a computer accessible medium 1300, according to one embodiment. The computer accessible medium may include update and recovery management software 1310 executable to implement the functionality of update manager 130 and recovery manager 180 as described above, including components of the update and recovery managers that may be executed at one or more nodes 105 of cluster 101 or at devices that do not belong to cluster 101. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. In some embodiments, update and recovery management software 1310 may be included within an operating system, volume manager, or another software package. In other embodiments, one or more components of update and recovery management software 1310 may be packaged as independent software modules. In some embodiments, part or all of the functionality of an update manager 130 and/or a recovery manager 180 may be implemented via one or more hardware devices (e.g., via one or more Field Programmable Gate Array (FPGA) devices) or in firmware.

In general, physical nodes 105 of a cluster 101 may include any of a variety of devices capable of supporting application instances 110 and/or one or more components of update manager 130. In one embodiment, for example, each node of cluster 101 may be a separate computer server. Each computer server may comprise one or more processors coupled to one or more memories, as well as one or more I/O interfaces such as storage adapters allowing access to storage I/O channels, network interface cards, a mouse, keyboard and other peripherals. The one or more processors may be implemented using any desired architecture or chip set, such as the SPARC™ architecture from Sun Microsystems or the x86-compatible architectures from Intel Corporation, Advanced Micro Devices, etc. The one or more memories may be implemented using any appropriate medium such as any of various types of RAM (e.g., DRAM, SDRAM, RDRAM, SRAM, etc.). In some embodiments, the operating system in use at one node 105 may differ from the operating system in use at another node. In one embodiment, one or more intelligent storage devices, such as intelligent switches, may provide storage for one or more nodes of a shared data cluster 101. Storage backing local persistent stores 120 as well as shared storage devices 160 may include any of a number of different types of physical storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage network;
   a plurality of nodes coupled to the storage network, wherein the plurality of nodes includes at least two nodes that form a cluster, wherein the plurality of nodes includes a first node, and wherein the first node includes a first computer-accessible storage medium having stored thereon a first set of program instructions;
   a plurality of local persistent stores, each of which is coupled to the storage network;
   a shared storage device coupled to the storage network; and
   a computer system coupled to the storage network, wherein the computer system includes a second computer-accessible storage medium having stored thereon a second set of program instructions;
   wherein the first set of program instructions is executable by the first node to:
      for an update directed to the shared storage device by the first node, redirect the update to a first of the plurality of local persistent stores, wherein the first local persistent store corresponds to the first node; and
      in response to a successful verification of membership status of the first node in the cluster, cause contents of the update to be transferred from the first local persistent store to the shared storage device;
   wherein the second set of program instructions is executable by the computer system to perform, at least in part, the verification of membership status of the first node in the cluster.

2. The system as recited in claim 1, wherein the first set of program instructions is executable by the first node to:
   transmit an update completion indication after contents of the update have been written to the local persistent store; and
   transfer contents of the update to the shared storage device asynchronously with respect to a transmission of the update completion indication.

3. The system as recited in claim 1, wherein the local persistent store is a local update log.

4. The system as recited in claim 3, wherein the update includes one or more modified data blocks, and wherein, in redirecting the update to the local update log, the first set of program instructions is executable by the first node to cause a log entry corresponding to the one or more modified data blocks to be added to the local update log.

5. The system as recited in claim 3, wherein an index to the one or more modified blocks is included in the log entry.

6. The system as recited in claim 1, wherein the update includes one or more modified data blocks, and wherein, in redirecting the update, the first set of program instructions is executable to cause an entry to be inserted into the local persistent store, wherein the inserted entry includes the one or more modified blocks and cluster configuration information available at the first node.

7. The system as recited in claim 6, wherein the cluster configuration information includes at least one of: a cluster generation number and an identification of current cluster member nodes;
   and wherein the second set of program instructions is executable to use the cluster configuration information to perform the verification of the membership status of the first node.

8. The system as recited in claim 1, wherein the first set of program instructions is executable to cause one or more cluster configuration entries to be inserted into the local persistent store, wherein each cluster configuration entry of the one or more cluster configuration entries includes cluster configuration information available at the first node, and wherein the second set of program instructions is executable to use at least one cluster configuration entry of the one or more cluster configuration entries to perform the verification of the membership status of the first node.

9. The system as recited in claim 8, wherein the first set of program instructions is executable to cause a new cluster configuration entry to be inserted into the local persistent store in response to a change to a configuration of the cluster being detected at the first node.

10. The system as recited in claim 1, further comprising a third set of program instructions executable to implement a recovery manager, wherein after a failure, the third set of program instructions is executable to:
    make a determination as to whether a particular update at the local persistent store corresponding to a particular node of the cluster was performed while the particular node was in an invalid partition of the cluster; and
    in response to the determination being positive, exclude the particular update from a set of updates, wherein the third set of program instructions is executable to cause, at least in part, contents of the set of updates, excluding the particular update, to be copied to the shared storage device in response to the particular node rejoining a valid partition of the cluster.

11. The system as recited in claim 1, wherein the second set of program instructions is executable to determine whether the first node belongs to a quorum in accordance with a configurable quorum detection policy; and wherein the membership status of the first node in the cluster is dependent on whether the first node belongs to the quorum.

12. The system as recited in claim 11, wherein the quorum detection policy identifies a particular cluster partition as a quorum if the particular cluster partition includes a specified number of nodes.

13. The system as recited in claim 1, wherein the local persistent store is a local database system.

14. The system as recited in claim 1, wherein each node of the two or more nodes in the cluster corresponds to a different instance of a clustered application.

15. A method, comprising:
for an update directed to a shared storage device by a first node of a plurality of nodes within a storage network, wherein two or more of the plurality of nodes form a cluster, and wherein the shared storage device is coupled to the storage network:
a computer system executing stored program instructions to cause the computer system to perform operations including:
redirecting the update to a local persistent store corresponding to the first node, wherein the computer system is coupled to the shared storage device through the storage network, and wherein the local persistent store is one of a plurality of local persistent stores; and
in response to the computer system receiving an indication of a successful verification of membership status of the first node in the cluster, causing contents of the update from the local persistent store to be transferred to the shared storage device;
wherein the indication of a successful verification of membership status of the first node in the cluster is received from another computer system coupled to the storage network.

16. The method as recited in claim 15, further comprising:
the computer system transmitting an update completion indication after contents of the update have been written to the local persistent store; and
wherein the transfer of contents of the update to the shared storage device is asynchronous with respect to the transmitting of the update completion indication.

17. The method as recited in claim 15, wherein the update includes one or more modified data blocks, and wherein redirecting the update to the local persistent store includes adding a log entry corresponding to the one or more modified data blocks to the local persistent store.

18. The method as recited in claim 15, further comprising the computer system:
causing cluster configuration relating to the first node to be inserted into the local persistent store; and
wherein the verification of membership status of the first node uses the cluster configuration information.

19. The method as recited in claim 15, wherein, after a change to a configuration of the cluster, the verification of membership status of the first node includes determining whether the first node belongs to a quorum in accordance with a configurable quorum detection policy.

20. A computer-accessible storage medium comprising program instructions, wherein the instructions are executable by a computer system to cause the computer system to:
for an update directed to a shared storage device by a first node in a plurality of nodes within a storage network, wherein two or more of the plurality of nodes form a cluster:
redirect the update to a first local persistent store corresponding to the first node, wherein the first local persistent store is one of a plurality of local persistent stores; and
in response to the first node receiving an indication of a successful verification of membership status of the first node in the cluster, cause contents of the update to be transferred from the first local persistent store to the shared storage device;
wherein the indication of a successful verification of membership status of the first node in the cluster is received from another computer system connected to the storage network; and
wherein the shared storage device is connected to the storage network, and wherein the computer system is connected to the storage network.

21. The computer-accessible storage medium recited in claim 20, wherein the instructions are further executable by the computer system to:
transmit an update completion indication after contents of the update have been written to the local persistent store; and
transfer contents of the update to the shared storage device asynchronously with respect to a transmission of the update completion indication.

22. The computer-accessible storage medium recited in claim 20, wherein the update includes one or more modified data blocks, and wherein in redirecting the update to the local persistent store, the instructions are further executable by the computer system to cause a log entry corresponding to the one or more modified data blocks to be added to the local persistent store.

23. The computer-accessible storage medium recited in claim 20, wherein the instructions are further executable by the computer system to:
cause cluster configuration available at the first node to be inserted into the local persistent store; and
wherein the verification of membership status of the first node in the cluster is based, at least in part, on the cluster configuration information.

24. The system of claim 1, wherein the computer system is a second one of the plurality of nodes.

25. The system of claim 10, wherein the third set of program instructions are stored on the second computer-accessible storage medium of the computer system coupled to the storage network.

26. The method as recited in claim 15, wherein the computer system includes the first node.

27. The computer-accessible storage medium recited in claim 20, wherein the computer system includes the first node.

* * * * *